US009261672B2

(12) United States Patent
Lin et al.

(10) Patent No.: US 9,261,672 B2
(45) Date of Patent: Feb. 16, 2016

(54) MOBILE DEVICE AND OPTICAL IMAGING LENS THEREOF

(71) Applicant: GeniuS Electronic Optical Co., Ltd., Taichung (TW)

(72) Inventors: Chia-Cheng Lin, Taichung (TW); Ta-Cheng Fan, Taichung (TW); Jia-Sin Jhang, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 11 days.

(21) Appl. No.: 14/256,769

(22) Filed: Apr. 18, 2014

(65) Prior Publication Data

US 2015/0103244 A1 Apr. 16, 2015

(30) Foreign Application Priority Data

Oct. 11, 2013 (CN) .......................... 2013 1 0472427

(51) Int. Cl.

*G02B 3/02* (2006.01)
*G02B 9/60* (2006.01)
*G02B 13/00* (2006.01)

(52) U.S. Cl.

CPC .............. *G02B 9/60* (2013.01); *G02B 13/0045* (2013.01)

(58) Field of Classification Search

CPC .................................................. G02B 13/0045
USPC ........................................................ 359/714
See application file for complete search history.

(56) References Cited

U.S. PATENT DOCUMENTS

| | | | | |
|---|---|---|---|---|
| 7,502,181 | B2 | 3/2009 | Shinohara | |
| 7,826,151 | B2 | 11/2010 | Tsai | |
| 8,339,718 | B1 | 12/2012 | Tang | |
| 8,379,324 | B2 | 2/2013 | Tsai | |
| 8,422,145 | B2 | 4/2013 | Ise | |
| 2012/0162769 | A1 * | 6/2012 | Suzuki et al. | 359/558 |
| 2012/0194920 | A1 | 8/2012 | Huang | |
| 2013/0016435 | A1 | 1/2013 | Tsai | |
| 2014/0313594 | A1 * | 10/2014 | Lee | 359/714 |

FOREIGN PATENT DOCUMENTS

| | | |
|---|---|---|
| TW | M370083 | 12/2009 |
| TW | 201224506 | 6/2012 |
| TW | 201333523 | 8/2013 |

OTHER PUBLICATIONS

Official Action from Taiwan Patent Application No. 102138718 dated Oct. 24, 2014.

* cited by examiner

*Primary Examiner* — James Jones
(74) *Attorney, Agent, or Firm* — Baker & McKenzie LLP

(57) ABSTRACT

The present embodiments provide a mobile device and an optical imaging lens thereof. The optical imaging lens comprises a first lens element, an aperture, a second lens element, a third lens element, a fourth lens element, and a fifth lens element positioned in an order from an object side to an image side. Through controlling the convex or concave shape of the surfaces and/or the refracting power of the lens elements, the total length of the optical image lens is shortened, the field of view is broadened, and the better image performance is maintained. Above all, the optical imaging lens of the present invention is capable of shortening the total length of the optical imaging lens efficiently, enlarging the half field of view of the optical imaging lens, and showing better optical characteristics.

18 Claims, 27 Drawing Sheets

650nm
555nm
470nm

Longitudinal spherical aber. field
1
-0.05 0 0.05
Focus (mm)
(a)

Astigmatic field curves (Sagittal direction) Image height(mm)
2.268
-0.1 0.00 0.1
Focus (mm)
(b)

Astigmatic field curves (Tangential direction) Image height(mm)
2.268
-0.1 0.00 0.1
Focus (mm)
(c)

Distortion Image height(mm)
2.268
-2 0 2
Percent (%)
(d)

| f(Focus)= 2.060mm, HFOV(Half angular field of view)= 47.229deg., System length= 3.946mm, Fno=2.4 | | | | | | | |
|---|---|---|---|---|---|---|---|
| Surface # | | Radius | Thickness | Refractive index | Abbe number | Focus | Material |
| - | Object | ∞ | 500 | | | | |
| 111 | 1st lens element | 3.1975 | 0.3800 | 1.535 | 55.712 | 9.757 | plastic |
| 112 | | 7.8682 | 0.2279 | | | | |
| 100 | Aperture stop | ∞ | 0.0631 | | | | |
| 121 | 2nd lens element | -10.0145 | 0.4707 | 1.535 | 55.712 | 2.249 | plastic |
| 122 | | -1.0950 | 0.2891 | | | | |
| 131 | 3rd lens element | -0.4708 | 0.2200 | 1.638 | 23.256 | -2.633 | plastic |
| 132 | | -0.7715 | 0.0500 | | | | |
| 141 | 4th lens element | 4.5793 | 0.6943 | 1.535 | 55.712 | 1.437 | plastic |
| 142 | | -0.8784 | 0.0550 | | | | |
| 151 | 5th lens element | 2.8267 | 0.4820 | 1.638 | 23.256 | -1.828 | plastic |
| 152 | | 0.7747 | 0.4000 | | | | |
| 161 | IR cut filter | ∞ | 0.2100 | | | | |
| 162 | | ∞ | 0.4036 | | | | |
| 170 | Image plane | ∞ | | | | | |

FIG. 4

| Aspherical parameters | | | | | |
|---|---|---|---|---|---|
| Surface # | 111 | 112 | 121 | 122 | 131 |
| K | -3.134241 | 26.25962 | 0 | 1.067436 | -0.6714317 |
| $a_4$ | 0.13162312 | 0.2525729 | -0.204741 | -0.1098071 | 0.53965567 |
| $a_6$ | -0.0173505 | -0.2868962 | -0.2863752 | -0.533415 | 0.44198439 |
| $a_8$ | -0.0026798 | 0.06439793 | -2.3885523 | 0.80337128 | 1.8781774 |
| $a_{10}$ | 0.0334211 | 0.51380726 | -4.4803069 | -0.7424125 | -0.0506868 |
| $a_{12}$ | -0.0142367 | 0.16669421 | -5.413397 | -2.564309 | 0.42934553 |
| $a_{14}$ | 0.00551302 | -0.3627004 | -5.8383158 | -2.7555489 | |
| $a_{16}$ | 0.02688829 | -0.0805367 | | | |
| Surface # | 132 | 141 | 142 | 151 | 152 |
| K | -0.6941023 | -4.077878 | -9.281488 | -1.89982 | -8.039847 |
| $a_4$ | 0.03187416 | 0.04917616 | 0.05632048 | -0.2502443 | -0.1376258 |
| $a_6$ | 0.28486358 | -0.0216948 | 0.00646951 | -0.007857 | 0.04265456 |
| $a_8$ | 0.16277278 | -0.090762 | -0.0067479 | 0.03199313 | -0.009611 |
| $a_{10}$ | -0.155652 | 0.12117967 | -0.0106821 | -0.001316 | 0.00125682 |
| $a_{12}$ | 0.37413829 | -0.076409 | 0.00076611 | -0.0020462 | 0.00013901 |
| $a_{14}$ | | 0.01367367 | 0.00208059 | -8.3748E-05 | -0.0001384 |
| $a_{16}$ | | 0.00211586 | -0.0005658 | 0.00016754 | 2.1867E-05 |

FIG. 5

| f(Focus)= 2.121mm, HFOV(Half angular field of view)= 46.762deg., System length= 3.963mm, Fno=2.4 | | | | | | | |
|---|---|---|---|---|---|---|---|
| Surface # | | Radius | Thickness | Refractive index | Abbe number | Focus | Material |
| - | Object | ∞ | 500 | | | | |
| 211 | 1st lens element | 2.5118 | 0.4036 | 1.535 | 55.712 | 8.259 | plastic |
| 212 | | 5.4694 | 0.2497 | | | | |
| 200 | Aperture stop | ∞ | 0.0604 | | | | |
| 221 | 2nd lens element | 1207.7740 | 0.6174 | 1.535 | 55.712 | 2.623 | plastic |
| 222 | | -1.4093 | 0.1986 | | | | |
| 231 | 3rd lens element | -0.4909 | 0.2200 | 1.638 | 23.256 | -3.750 | plastic |
| 232 | | -0.7245 | 0.0500 | | | | |
| 241 | 4th lens element | 3.3060 | 0.7651 | 1.535 | 55.712 | 1.289 | plastic |
| 242 | | -0.8042 | 0.0860 | | | | |
| 251 | 5th lens element | 2.1394 | 0.2230 | 1.638 | 23.256 | -1.479 | plastic |
| 252 | | 0.6315 | 0.4000 | | | | |
| 261 | IR cut filter | ∞ | 0.2100 | | | | |
| 262 | | ∞ | 0.4796 | | | | |
| 270 | Image plane | ∞ | | | | | |

FIG. 8

| Aspherical parameters | | | | | |
|---|---|---|---|---|---|
| Surface # | 211 | 212 | 221 | 222 | 231 |
| K | -4.583089 | 2.857718 | 0 | 1.20585 | -0.6763562 |
| $a_4$ | 0.12917946 | 0.21270192 | -0.2227959 | -0.2877219 | 0.4393449 |
| $a_6$ | 0.01454545 | -0.2954364 | -0.2745769 | -0.4979613 | 0.34529538 |
| $a_8$ | -0.0331121 | -0.1051339 | -0.2131874 | 0.96925519 | 1.3905239 |
| $a_{10}$ | 0.01133727 | 0.1741221 | -1.3336979 | -0.5752517 | -0.2242523 |
| $a_{12}$ | -0.0243649 | -0.0581582 | -1.3331114 | -0.224495 | 0.29712145 |
| $a_{14}$ | 0.00388412 | -0.195638 | -0.7674301 | 0.35790465 | |
| $a_{16}$ | -0.0355986 | 0.21195645 | | | |
| Surface # | 232 | 241 | 242 | 251 | 252 |
| K | -0.8811881 | -12.35626 | -7.45795 | -1.9956 | -5.25958 |
| $a_4$ | 0.15053341 | 0.0512296 | 0.08255563 | -0.2500386 | -0.1440492 |
| $a_6$ | 0.19715414 | -0.0134308 | 0.00640903 | -0.0076431 | 0.04235003 |
| $a_8$ | 0.0290767 | -0.0902514 | -0.0073489 | 0.03192238 | -0.0096531 |
| $a_{10}$ | -0.2766281 | 0.12064842 | -0.0107585 | -0.0013335 | 0.00122514 |
| $a_{12}$ | 0.31965575 | -0.0770243 | 0.00090319 | -0.0020855 | 0.00013268 |
| $a_{14}$ | | 0.0132613 | 0.00220528 | -0.0001067 | -0.0001389 |
| $a_{16}$ | | 0.0018536 | -0.0004942 | 0.00015508 | 2.28E-05 |

FIG. 9

| f(Focus)= 2.221mm, HFOV(Half angular field of view)=45.491 deg., System length= 3.930mm, Fno=2.4 | | | | | | | |
|---|---|---|---|---|---|---|---|
| Surface # | | Radius | Thickness | Refractive index | Abbe number | Focus | Material |
| - | Object | ∞ | 500 | | | | |
| 311 | 1st lens element | 2.4728 | 0.4159 | 1.535 | 55.712 | 8.138 | plastic |
| 312 | | 5.3637 | 0.0729 | | | | |
| 300 | Aperture stop | ∞ | 0.0080 | | | | |
| 321 | 2nd lens element | 70.4359 | 0.6680 | 1.535 | 55.712 | 2.835 | plastic |
| 322 | | -1.5504 | 0.2517 | | | | |
| 331 | 3rd lens element | -0.4890 | 0.2172 | 1.638 | 23.256 | -3.376 | plastic |
| 332 | | -0.7410 | 0.0530 | | | | |
| 341 | 4th lens element | 4.5043 | 0.7285 | 1.535 | 55.712 | 1.436 | plastic |
| 342 | | -0.8775 | 0.2574 | | | | |
| 351 | 5th lens element | 2.5067 | 0.2267 | 1.638 | 23.256 | -1.634 | plastic |
| 352 | | 0.7139 | 0.4000 | | | | |
| 361 | IR cut filter | ∞ | 0.2100 | | | | |
| 362 | | ∞ | 0.4210 | | | | |
| 370 | Image plane | ∞ | | | | | |

FIG. 12

| Aspherical parameters | | | | | |
|---|---|---|---|---|---|
| Surface # | 311 | 312 | 321 | 322 | 331 |
| K | -5.607773 | 33.97528 | 0 | 0.9048891 | -0.6778954 |
| $a_4$ | 0.12406786 | 0.24173448 | 0.01143088 | -0.2545115 | 0.42972001 |
| $a_6$ | 0.01390888 | -0.2237596 | -0.1993808 | -0.4766093 | 0.35595969 |
| $a_8$ | -0.0011041 | -0.1477946 | -0.3705228 | 0.9126125 | 1.0432055 |
| $a_{10}$ | 0.06988235 | -0.1092702 | -4.0007398 | -0.8590024 | -0.1076184 |
| $a_{12}$ | -0.0002527 | -2.6550413 | -3.862815 | -0.2417 | 0.61672217 |
| $a_{14}$ | -0.0280061 | -3.9914901 | -1.64137 | -0.7683623 | |
| $a_{16}$ | -0.1278677 | -3.9273342 | | | |
| Surface # | 332 | 341 | 342 | 351 | 352 |
| K | -0.8802539 | -5.020242 | -7.141302 | -0.7558118 | -6.132422 |
| $a_4$ | 0.15055398 | 0.05837206 | 0.06870076 | -0.2424644 | -0.1472777 |
| $a_6$ | 0.19573563 | -0.0175152 | 0.00813557 | -0.0091622 | 0.04354498 |
| $a_8$ | 0.02631917 | -0.0918062 | -0.0066161 | 0.03124491 | -0.009458 |
| $a_{10}$ | -0.2830311 | 0.11978307 | -0.0104875 | -0.0015609 | 0.00123772 |
| $a_{12}$ | 0.30155859 | -0.0774604 | 0.00098111 | -0.0021373 | 0.00013243 |
| $a_{14}$ | | 0.01302418 | 0.00223504 | -0.000121 | -0.0001397 |
| $a_{16}$ | | 0.00168092 | -0.000484 | 0.00015146 | 2.25E-05 |

FIG. 13

| f(Focus)=2.110mm, HFOV(Half angular field of view)= 46.611deg., System length= 3.966mm, Fno=2.4 | | | | | | | |
|---|---|---|---|---|---|---|---|
| Surface # | | Radius | Thickness | Refractive index | Abbe number | Focus | Material |
| - | Object | ∞ | 500 | | | | |
| 411 | 1st lens element | 1.9481 | 0.3202 | 1.535 | 55.712 | plastic | 15.557 |
| 412 | | 2.3949 | 0.1763 | | | | |
| 400 | Aperture stop | ∞ | 0.0752 | | | | |
| 421 | 2nd lens element | 13.7797 | 0.5612 | 1.535 | 55.712 | plastic | 2.513 |
| 422 | | -1.4739 | 0.3099 | | | | |
| 431 | 3rd lens element | -0.4973 | 0.2200 | 1.638 | 23.256 | plastic | -2.755 |
| 432 | | -0.8113 | 0.0500 | | | | |
| 441 | 4th lens element | 6.1775 | 0.7284 | 1.535 | 55.712 | plastic | 1.431 |
| 442 | | -0.8410 | 0.0500 | | | | |
| 451 | 5th lens element | 0.7931 | 0.2200 | 1.638 | 23.256 | plastic | -2.394 |
| 452 | | 0.4666 | 0.5500 | | | | |
| 461 | IR cut filter | ∞ | 0.2100 | | | | |
| 462 | | ∞ | 0.4945 | | | | |
| 470 | Image plane | ∞ | | | | | |

FIG. 16

| Aspherical parameters | | | | | |
|---|---|---|---|---|---|
| Surface # | 411 | 412 | 421 | 422 | 431 |
| K | -3.464978 | -8.005368 | 0 | 3.370503 | -0.668226 |
| $a_4$ | 0.14664411 | 0.2051082 | -0.2524971 | -0.3030137 | 0.48097567 |
| $a_6$ | -0.0073229 | -0.2248579 | -0.6230533 | -0.1226273 | -0.0222921 |
| $a_8$ | -0.0431106 | -0.5639336 | -2.0540006 | -0.8288634 | 1.2924937 |
| $a_{10}$ | -0.0416415 | -1.1818795 | 7.0643828 | -0.7800757 | -0.2729983 |
| $a_{12}$ | -0.124713 | -1.6529011 | -49.714674 | 7.7107341 | 0.93976467 |
| $a_{14}$ | -0.152628 | 1.2276049 | -49.715352 | -11.143809 | |
| $a_{16}$ | -0.3675602 | 10.963632 | | | |
| Surface # | 432 | 441 | 442 | 451 | 452 |
| K | -0.889974 | -524.855 | -5.219484 | -3.987915 | -2.882984 |
| $a_4$ | 0.12276111 | 0.01582482 | -0.0889031 | -0.1298815 | -0.1534266 |
| $a_6$ | 0.27688453 | 0.00075294 | 0.06731405 | -0.0197085 | 0.05274212 |
| $a_8$ | 0.05663906 | -0.1005226 | -0.0110589 | 0.0224189 | -0.0127007 |
| $a_{10}$ | -0.3446215 | 0.1120019 | -0.0187336 | -0.0025068 | 0.00102277 |
| $a_{12}$ | 0.16884685 | -0.0699342 | 6.41E-05 | -0.0020362 | 0.00023895 |
| $a_{14}$ | | 0.02035386 | 0.00305596 | -8.56E-05 | -0.0001205 |
| $a_{16}$ | | 1.19E-05 | 0.00134866 | 0.00020084 | 1.70E-05 |

FIG. 17

| f(Focus)= 2.388mm, HFOV(Half angular field of view)= 42.836deg., System length= 4.010mm, Fno=2.4 | | | | | | | |
|---|---|---|---|---|---|---|---|
| Surface # | | Radius | Thickness | Refractive index | Abbe number | Focus | Material |
| - | Object | ∞ | 500 | | | | |
| 511 | 1st lens element | 2.2571 | 0.4050 | 1.535 | 55.712 | 7.580 | plastic |
| 512 | | 4.7514 | 0.3245 | | | | |
| 500 | Aperture stop | ∞ | 0.0918 | | | | |
| 521 | 2nd lens element | -42.2457 | 0.4808 | 1.535 | 55.712 | 3.114 | plastic |
| 522 | | -1.6144 | 0.2548 | | | | |
| 531 | 3rd lens element | -0.4951 | 0.2200 | 1.638 | 23.256 | -4.096 | plastic |
| 532 | | -0.7157 | 0.0500 | | | | |
| 541 | 4th lens element | 27.8195 | 0.4051 | 1.535 | 55.712 | 1.502 | plastic |
| 542 | | -0.8262 | 0.0800 | | | | |
| 551 | 5th lens element | 1.8020 | 0.2582 | 1.638 | 23.256 | -1.954 | plastic |
| 552 | | 0.6987 | 0.4000 | | | | |
| 561 | IR cut filter | ∞ | 0.2100 | | | | |
| 562 | | ∞ | 0.8292 | | | | |
| 570 | Image plane | ∞ | | | | | |

FIG. 20

| Aspherical parameters | | | | | |
|---|---|---|---|---|---|
| Surface # | 511 | 512 | 521 | 522 | 531 |
| K | -4.793893 | 2.287382 | 0 | 0.6354918 | -0.6791858 |
| $a_4$ | 0.12382288 | 0.21154853 | -0.2192686 | -0.375129 | 0.55618181 |
| $a_6$ | 0.00578832 | -0.291746 | -0.5881227 | -0.3266329 | 0.41258492 |
| $a_8$ | -0.0384092 | -0.1043681 | -0.2481257 | 0.76784274 | 0.90428065 |
| $a_{10}$ | 0.00942332 | 0.17192211 | -1.8037463 | -1.27305 | -0.1072518 |
| $a_{12}$ | -0.0238461 | -0.0625621 | -1.9895189 | -0.2269282 | 0.37826158 |
| $a_{14}$ | 0.00599243 | -0.2019536 | -1.7401206 | 0.41545856 | |
| $a_{16}$ | -0.0324318 | 0.20343776 | | | |
| Surface # | 532 | 541 | 542 | 551 | 552 |
| K | -0.8490967 | 424.0334 | -7.16754 | -1.823447 | -5.680062 |
| $a_4$ | 0.12429459 | 0.06556324 | 0.10504035 | -0.2462425 | -0.1514109 |
| $a_6$ | 0.23359602 | -0.0124469 | 0.01244552 | -0.0048337 | 0.04134543 |
| $a_8$ | 0.03663977 | -0.0931727 | -6.05E-03 | 0.03280454 | -0.0092731 |
| $a_{10}$ | -0.2871689 | 0.11798066 | -0.010454 | -1.08E-03 | 0.00131217 |
| $a_{12}$ | 0.32003623 | -7.72E-02 | 0.00098548 | -0.0020088 | 1.25E-04 |
| $a_{14}$ | | 0.01441115 | 0.0022508 | -8.35E-05 | -0.0001522 |
| $a_{16}$ | | 0.00325484 | -0.0004521 | 0.00016067 | 1.58E-05 |

FIG. 21

| f(Focus)=2.097mm, HFOV(Half angular field of view)= 47.116 deg., System length= 3.649mm, Fno=2.4 | | | | | | | |
|---|---|---|---|---|---|---|---|
| Surface # | | Radius | Thickness | Refractive index | Abbe number | Focus | Material |
| - | Object | ∞ | 500 | | | | |
| 611 | 1st lens element | 2.8748 | 0.3323 | 1.535 | 55.712 | 11.724 | plastic |
| 612 | | 5.0788 | 0.0610 | | | | |
| 600 | Aperture stop | ∞ | 0.0350 | | | | |
| 621 | 2nd lens element | 36.4158 | 0.3266 | 1.535 | 55.712 | 2.413 | plastic |
| 622 | | -1.3386 | 0.4377 | | | | |
| 631 | 3rd lens element | -0.4931 | 0.2344 | 1.638 | 23.256 | -3.605 | plastic |
| 632 | | -0.7429 | 0.0500 | | | | |
| 641 | 4th lens element | 45.7677 | 0.7295 | 1.535 | 55.712 | 1.362 | plastic |
| 642 | | -0.7387 | 0.0500 | | | | |
| 651 | 5th lens element | 2.2763 | 0.3596 | 1.638 | 23.256 | -1.672 | plastic |
| 652 | | 0.6850 | 0.4000 | | | | |
| 661 | IR cut filter | ∞ | 0.2100 | | | | |
| 662 | | ∞ | 0.4233 | | | | |
| 670 | Image plane | ∞ | | | | | |

FIG. 24

| Aspherical parameters | | | | | |
|---|---|---|---|---|---|
| Surface # | 611 | 612 | 621 | 622 | 631 |
| K | -24.8313 | -30.6492 | 0 | 0.1308252 | -0.6775626 |
| $a_4$ | 0.04780863 | 0.18969535 | -0.0762936 | -0.1385801 | 0.49360404 |
| $a_6$ | -0.0902519 | -0.2171386 | 0.46817995 | -0.5552716 | 0.35398534 |
| $a_8$ | -0.1882118 | 0.54424308 | -2.2511546 | 0.74055183 | 1.6446416 |
| $a_{10}$ | -0.2136145 | 3.0181535 | -0.8180844 | -1.1156228 | -0.2984094 |
| $a_{12}$ | -0.2597033 | 9.322134 | 9.3799398 | -3.0997515 | 0.10773622 |
| $a_{14}$ | 0.09178859 | 13.131757 | 8.314233 | 9.6514505 | |
| $a_{16}$ | 1.5556804 | -141.33537 | | | |
| Surface # | 632 | 641 | 642 | 651 | 652 |
| K | -0.8407556 | 1446.518 | -5.550809 | -0.684971 | -6.091053 |
| $a_4$ | 0.12426648 | 0.10843383 | 0.03594829 | -0.2344268 | -0.1496649 |
| $a_6$ | 0.222781 | -0.0416771 | 0.00841208 | -0.0085684 | 0.0465138 |
| $a_8$ | 0.083109 | -0.10266 | -0.006234 | 0.03036987 | -0.0090648 |
| $a_{10}$ | -0.224783 | 0.12315918 | -0.0109056 | -0.001835 | 0.00121884 |
| $a_{12}$ | 0.34506349 | -0.0740843 | 0.00068683 | -0.0022047 | 0.00011118 |
| $a_{14}$ | | 0.0141382 | 0.00210511 | -0.0001369 | -0.0001451 |
| $a_{16}$ | | 0.00136536 | -0.0004873 | 0.0001347 | 2.17E-05 |

FIG. 25

| f(Focus)= 2.291mm, HFOV(Half angular field of view)= 44.813 deg., System length= 4.231mm, Fno=2.4 | | | | | | | |
|---|---|---|---|---|---|---|---|
| Surface # | | Radius | Thickness | Refractive index | Abbe number | Focus | Material |
| - | Object | ∞ | 500 | | | | |
| 711 | 1st lens element | 2.7391 | 0.4127 | 1.535 | 55.712 | 10.532 | plastic |
| 712 | | 5.0337 | 0.1644 | | | | |
| 700 | Aperture stop | ∞ | 0.0069 | | | | |
| 721 | 2nd lens element | 14.9639 | 0.7088 | 1.535 | 55.712 | 2.687 | plastic |
| 722 | | -1.5700 | 0.2374 | | | | |
| 731 | 3rd lens element | -0.4917 | 0.2379 | 1.638 | 23.256 | -3.564 | plastic |
| 732 | | -0.7446 | 0.0796 | | | | |
| 741 | 4th lens element | 4.6536 | 0.8012 | 1.535 | 55.712 | 1.402 | plastic |
| 742 | | -0.8439 | 0.0830 | | | | |
| 751 | 5th lens element | 2.1317 | 0.3528 | 1.638 | 23.256 | -1.539 | plastic |
| 752 | | 0.6319 | 0.4000 | | | | |
| 761 | IR cut filter | ∞ | 0.2100 | | | | |
| 762 | | ∞ | 0.5366 | | | | |
| 770 | Image plane | ∞ | | | | | |

FIG. 28

| Aspherical parameters | | | | | |
|---|---|---|---|---|---|
| Surface # | 711 | 712 | 721 | 722 | 731 |
| K | -5.823383 | 7.288355 | 0 | 0.2010023 | -0.6766177 |
| $a_4$ | 0.12402468 | 0.21948015 | -0.1210427 | -0.2537402 | 0.43835045 |
| $a_6$ | 0.01068403 | -0.2946182 | 0.14759612 | -0.4305679 | 0.34143819 |
| $a_8$ | -0.0336697 | -0.1223328 | -0.2618069 | 0.98072768 | 1.3048441 |
| $a_{10}$ | 0.01456873 | 0.13905087 | -2.7345823 | -0.7378066 | -0.2020271 |
| $a_{12}$ | -0.018879 | -0.1200006 | -2.7232082 | -0.2315714 | 0.33452299 |
| $a_{14}$ | 0.01015772 | -0.2736861 | -2.6029662 | 0.09455049 | |
| $a_{16}$ | -0.0286654 | 0.15466849 | | | |
| Surface # | 732 | 741 | 742 | 751 | 752 |
| K | -0.8722337 | 4.686308 | -7.632665 | -1.532596 | -5.713439 |
| $a_4$ | 0.14392713 | 0.06464708 | 0.06697978 | -0.2465668 | -0.1420148 |
| $a_6$ | 0.19984788 | -0.0210773 | 0.0073443 | -0.0074962 | 0.04356466 |
| $a_8$ | 0.03436637 | -0.090774 | -6.83E-03 | 0.03188328 | -9.44E-03 |
| $a_{10}$ | -0.2731832 | 0.12067203 | -0.0106467 | -1.31E-03 | 0.00125646 |
| $a_{12}$ | 0.3223088 | -7.66E-02 | 0.00093452 | -2.08E-03 | 1.36E-04 |
| $a_{14}$ | | 0.01340513 | 0.00222128 | -9.83E-05 | -0.0001385 |
| $a_{16}$ | | 0.00194972 | -0.0004842 | 0.00016011 | 2.28E-05 |

FIG. 29

| f(Focus)= 2.333mm, HFOV(Half angular field of view)= 43.311 deg., System length= 4.176mm, Fno=2.446 | | | | | | | |
|---|---|---|---|---|---|---|---|
| Surface # | | Radius | Thickness | Refractive index | Abbe number | Focus | Material |
| - | Object | ∞ | 500 | | | | |
| 811 | 1st lens element | 2.5607 | 0.4072 | 1.535 | 55.712 | 9.065 | plastic |
| 812 | | 5.1045 | 0.2376 | | | | |
| 800 | Aperture stop | ∞ | 0.0833 | | | | |
| 821 | 2nd lens element | -108.5131 | 0.5652 | 1.535 | 55.712 | 2.674 | plastic |
| 822 | | -1.4194 | 0.1695 | | | | |
| 831 | 3rd lens element | -0.4890 | 0.2200 | 1.638 | 23.256 | -3.679 | plastic |
| 832 | | -0.7250 | 0.0500 | | | | |
| 841 | 4th lens element | 3.7353 | 0.6872 | 1.535 | 55.712 | 1.272 | plastic |
| 842 | | -0.7817 | 0.0594 | | | | |
| 851 | 5th lens element | 2.0713 | 0.2924 | 1.638 | 23.256 | -1.516 | plastic |
| 852 | | 0.6261 | 0.4000 | | | | |
| 861 | IR cut filter | ∞ | 0.2100 | | | | |
| 862 | | ∞ | 0.5474 | | | | |
| 870 | Image plane | ∞ | | | | | |

FIG. 32

| Aspherical parameters | | | | | |
|---|---|---|---|---|---|
| Surface # | 811 | 812 | 821 | 822 | 831 |
| K | -4.206771 | 5.637477 | 0 | 1.549304 | -0.674045 |
| $a_4$ | 0.13204593 | 0.21375288 | -0.2398617 | -0.3684734 | 0.44319791 |
| $a_6$ | 0.01774889 | -0.2911726 | 0.10291641 | -0.5649822 | 0.35413297 |
| $a_8$ | -0.0297914 | -0.10136 | -3.132439 | 1.0960987 | 1.6952912 |
| $a_{10}$ | 0.01345891 | 0.17671773 | -3.0808288 | -0.3907204 | -0.2318838 |
| $a_{12}$ | -0.0229012 | -0.0601226 | 4.1535319 | -3.1653465 | 0.1459442 |
| $a_{14}$ | 0.00432182 | -0.2032265 | 0.43696846 | 2.343168 | |
| $a_{16}$ | -0.0360349 | 0.19845637 | | | |
| Surface # | 832 | 841 | 842 | 851 | 852 |
| K | -0.8946336 | -7.794743 | -7.24418 | -2.021834 | -5.200373 |
| $a_4$ | 0.15395624 | 0.04402603 | 0.08700271 | -0.2483906 | -0.1450175 |
| $a_6$ | 0.20722145 | -0.0174118 | 0.00624926 | -0.0070065 | 0.04301074 |
| $a_8$ | 0.04794081 | -0.0904077 | -0.0074341 | 0.03180925 | -0.0097245 |
| $a_{10}$ | -0.2534797 | 0.12162905 | -0.0108976 | -0.0013528 | 0.00117906 |
| $a_{12}$ | 0.34619616 | -0.0769962 | 0.0008054 | -0.0020859 | 0.00012534 |
| $a_{14}$ | | 0.01298358 | 0.00213406 | -0.0001089 | -0.0001387 |
| $a_{16}$ | | 0.0017227 | -0.0005237 | 0.0001517 | 2.30E-05 |

FIG. 33

| Embodiment | 1st Embodiment | 2nd Embodiment | 3rd Embodiment | 4th Embodiment | 5th Embodiment | 6th Embodiment | 7th Embodiment | 8th Embodiment |
|---|---|---|---|---|---|---|---|---|
| ALT | 2.247 | 2.229 | 2.256 | 2.050 | 1.769 | 1.982 | 2.513 | 2.172 |
| AAG | 0.685 | 0.645 | 0.643 | 0.661 | 0.801 | 0.634 | 0.571 | 0.600 |
| BFL | 1.014 | 1.090 | 1.031 | 1.255 | 1.439 | 1.033 | 1.147 | 1.157 |
| BFL/T5 | 2.103 | 4.885 | 4.547 | 5.702 | 5.574 | 2.873 | 3.250 | 3.958 |
| BFL/AG23 | 3.506 | 5.487 | 4.096 | 4.048 | 5.648 | 2.361 | 4.829 | 6.827 |
| ALT/T5 | 4.662 | 9.994 | 9.951 | 9.317 | 6.852 | 5.512 | 7.124 | 7.428 |
| AAG/AG12 | 2.354 | 2.079 | 7.944 | 2.630 | 1.924 | 6.602 | 3.335 | 1.869 |
| T3/AG23 | 0.761 | 1.108 | 0.863 | 0.710 | 0.863 | 0.535 | 1.002 | 1.298 |
| BFL/AG12 | 3.482 | 3.513 | 12.737 | 4.990 | 3.457 | 10.764 | 6.694 | 3.607 |
| T1/T5 | 0.788 | 1.810 | 1.834 | 1.455 | 1.569 | 0.924 | 1.170 | 1.393 |
| T2/T3 | 2.139 | 2.806 | 3.075 | 2.551 | 2.186 | 1.394 | 2.980 | 2.569 |
| AG23/AG12 | 0.993 | 0.640 | 3.110 | 1.233 | 0.612 | 4.560 | 1.386 | 0.528 |
| BFL/AAG | 1.479 | 1.690 | 1.603 | 1.897 | 1.796 | 1.630 | 2.007 | 1.930 |
| BFL/T2 | 2.153 | 1.765 | 1.544 | 2.235 | 2.993 | 3.164 | 1.618 | 2.048 |
| T4/T1 | 1.827 | 1.896 | 1.752 | 2.275 | 1.000 | 2.195 | 1.941 | 1.688 |
| AAG/T4 | 0.987 | 0.843 | 0.883 | 0.908 | 1.978 | 0.869 | 0.713 | 0.873 |
| T5/AG23 | 1.667 | 1.123 | 0.901 | 0.710 | 1.013 | 0.822 | 1.486 | 1.725 |
| T1/AG12 | 1.306 | 1.301 | 5.138 | 1.274 | 0.973 | 3.461 | 2.409 | 1.260 |

FIG. 34

MOBILE DEVICE AND OPTICAL IMAGING LENS THEREOF

This application claims priority from CN Patent Application No. 201310472427.7, filed on Oct. 11, 2013, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having five lens elements and an optical imaging lens thereof.

BACKGROUND

The ever-increasing demand for smaller sized mobile devices, such as cell phones, digital cameras, etc. has correspondingly triggered a growing need for smaller sized photography modules comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

U.S. Pat. No. 7,502,181, U.S. Pat. No. 7,826,151, and U.S. Pat. No. 8,422,145 all disclosed an optical imaging lens constructed with an optical imaging lens having five lens elements. Each of these patents has an aperture stop positioned in front of the first lens element, that leads the half field of view of the optical imaging lens is 32-33 degrees, which is difficult to meet the requirement of consumers. Besides, the system lengths of the optical imaging lenses of these patents are between 6.5 mm and 8.0 mm, which are difficult to meet the requirement of slimmer mobile devices.

How to effectively enlarge the half field of view of the optical imaging lens and shorten the length of the optical imaging lens is one of the most important topics in the industry to pursue the trend of smaller and smaller mobile devices. Therefore, there is a need to develop optical imaging lens with a shorter length, while also having good optical characters.

SUMMARY

An object of the present invention is to provide a mobile device and an optical imaging lens thereof. With controlling the convex or concave shape of the surfaces of the lens elements, the length of the optical imaging lens is shortened and the half field of view of the optical imaging lens is enlarged, and meanwhile the good optical characters, such as high resolution, are sustained.

In an exemplary embodiment, an optical imaging lens, sequentially from an object side to an image side, comprises a first lens element, an aperture stop, a second lens element, a third lens element, a fourth lens element, a fifth lens element, and a filtering unit. Each of said lens elements has an object-side surface facing toward the object side and an image-side surface facing toward the image side. The first lens element has a refractive power, and the object-side surface thereof is a convex surface. The second lens element has a refractive power. The object-side surface of the third lens element comprises a concave portion in a vicinity of the optical axis. The fourth lens element has a positive refractive power, and the object-side surface thereof comprises a convex portion in a vicinity of the optical axis and a concave portion in a vicinity of periphery of the fourth lens element. The fifth lens element has a refractive power, and the image-side surface thereof comprises a concave portion in a vicinity of the optical axis and a convex portion in a vicinity of a periphery of the fifth lens element. The optical imaging lens as a whole has only the five lens elements having refractive power.

In another exemplary embodiment, other equation (s), such as those relating to the ratio among parameters could be taken into consideration. For example, a distance from the image-side surface of the fifth lens element to an image plane along the optical axis defined as a back focal length of the optical imaging lens, BFL, and a central thickness of the fifth lens element along the optical axis, T5, could be controlled to satisfy the equation as follows:

$$2.0 \leq BFL/T5 \quad \text{Equation (1).}$$

In another exemplary embodiment, BFL and an air gap between the second lens element and the third lens element along the optical axis, AG23, could be controlled to satisfy the equation as follows:

$$3.5 \leq BFL/AG23 \quad \text{Equation (2).}$$

Yet, in another exemplary embodiment, the sum of the thickness of all five lens elements along the optical axis, ALT, and a central thickness of the fifth lens element along the optical axis, T5, could be controlled to satisfy the equation as follows:

$$ALT/T5 \leq 10.0 \quad \text{Equation (3).}$$

Yet, in another exemplary embodiment, the sum of all four air gaps from the first lens element to the fifth lens element along the optical axis, AAG, and an air gap between the first lens element and the second lens element along the optical axis, could be controlled to satisfy the equation as follows:

$$AAG/AG12 \leq 8.0 \quad \text{Equation (4).}$$

Yet, in another exemplary embodiment, AG23 and a central thickness of the third lens element along the optical axis, T3, could be controlled to satisfy the equation as follows:

$$0.7 \leq T3/AG23 \quad \text{Equation (5).}$$

Yet, in another exemplary embodiment, BFL and AG12 could be controlled to satisfy the equation as follows:

$$BFL/AG12 \leq 5.0 \quad \text{Equation (6).}$$

Yet, in another exemplary embodiment, T5 and a central thickness of the first lens element along the optical axis, T1, could be controlled to satisfy the equation as follows:

$$T1/T5 \leq 2.0 \quad \text{Equation (7).}$$

Yet, in another exemplary embodiment, T3 and a central thickness of the second lens element along the optical axis, T2, could be controlled to satisfy the equation as follows:

$$1.2 \leq T2/T3 \quad \text{Equation (8).}$$

Yet, in another exemplary embodiment, AG12 and AG23 could be controlled to satisfy the equation as follows:

$$AG23/AG12 \leq 5.0 \quad \text{Equation (9).}$$

Yet, in another exemplary embodiment, BFL and AAG could be controlled to satisfy the equation as follows:

$$1.4 \leq BFL/AAG \quad \text{Equation (10).}$$

Yet, in another exemplary embodiment, BFL and T2 could be controlled to satisfy the equation as follows:

$$BFL/T2 \leq 3.0 \quad \text{Equation (11).}$$

Yet, in another exemplary embodiment, T1 and a central thickness of the fourth lens element along the optical axis, T4, could be controlled to satisfy the equation as follows:

$$1.0 \leq T4/T1 \quad \text{Equation (12).}$$

Yet, in another exemplary, AAG and T4 could be controlled to satisfy the equation as follows:

$$AAG/T4 \leq 2.0 \quad \text{Equation (13).}$$

Yet, in another exemplary, T5 and AG23 could be controlled to satisfy the equation as follows:

$$1.0 \leq T5/AG23 \quad \text{Equation (14).}$$

Still in another exemplary embodiment, T1 and AG23 could be controlled to satisfy the equation as follows:

$$T1/AG12 \leq 2.5 \quad \text{Equation (15).}$$

Aforesaid exemplary embodiments are not limited and could be selectively incorporated in other embodiments described herein.

In some exemplary embodiments, more details about the convex or concave surface structure and/or the refractive power could be incorporated for one specific lens element or broadly for plural lens elements to enhance the control for the system performance and/or resolution.

In another exemplary embodiment, a mobile device comprises a housing and an image module positioned in the housing. The image module comprises any of aforesaid exemplary embodiments of optical imaging lens, a lens barrel, a module housing unit, and an image sensor. The lens barrel is configured to provide a space where the optical imaging lens having five lens elements is positioned. The module housing unit is configured to provide a space where the lens barrel is positioned. The image sensor is positioned at the image-side of the optical imaging lens.

Through controlling the arrangement of the convex or concave shape of the surface of the lens element(s) and/or refractive power, the mobile device and the optical imaging lens thereof in aforesaid exemplary embodiments achieve good optical characters and effectively shorten the lengths of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of the optical imaging lens of the present disclosures;

FIG. 5 is a table of aspherical data of a first embodiment of the optical imaging lens according to the present disclosures;

FIG. 8 is a table of optical data for each lens element of a second embodiment of the optical imaging lens of the present disclosures;

FIG. 9 is a table of aspherical data of a second embodiment of the optical imaging lens according to the present disclosures;

FIG. 12 is a table of optical data for each lens element of a third embodiment of the optical imaging lens according the present disclosures;

FIG. 13 is a table of aspherical data of a third embodiment of the optical imaging lens according the present disclosures;

FIG. 16 is a table of optical data for each lens element of a fourth embodiment of the optical imaging lens according the present disclosures;

FIG. 17 is a table of aspherical data of a fourth embodiment of the optical imaging lens according to the present disclosures;

FIG. 20 is a table of optical data for each lens element of a fifth embodiment of the optical imaging lens according the present disclosures;

FIG. 21 is a table of aspherical data of a fifth embodiment of the optical imaging lens according to the present disclosures;

FIG. 24 is a table of optical data for each lens element of a sixth embodiment of the optical imaging lens according the present disclosures;

FIG. 25 is a table of aspherical data of a sixth embodiment of the optical imaging lens according the present disclosures;

FIG. 28 is a table of optical data for each lens element of a seventh embodiment of the optical imaging lens according the present disclosures;

FIG. 29 is a table of aspherical data of a seventh embodiment of the optical imaging lens according the present disclosures;

FIG. 32 is a table of optical data for each lens element of an eighth embodiment of the optical imaging lens according the present disclosures;

FIG. 33 is a table of aspherical data of an eighth embodiment of the optical imaging lens according the present disclosures;

FIG. 34 is a table for the values of ALT, AAG, BFL, BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 of all eight example embodiments;

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
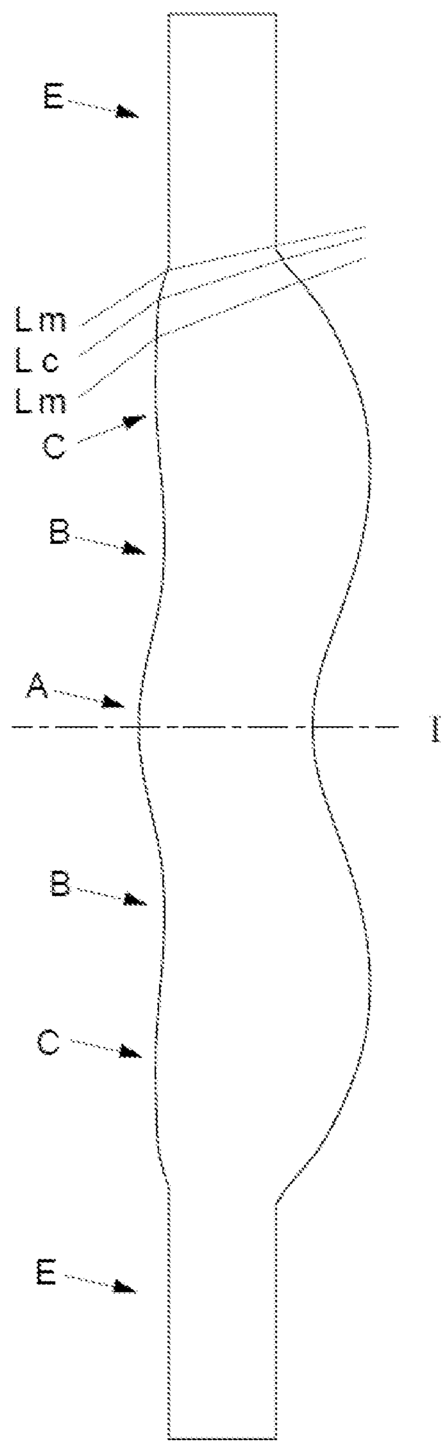
FIG. 1 is a cross-sectional view of one single lens element of one embodiment of an optical imaging lens according to the present disclosures.

Here in the present disclosures, the description "a lens element has a positive refractive power (or a negative refractive power)" means a portion of the lens has a positive refractive power (or a negative refractive power) in a vicinity of the optical axis. Furthermore, as used herein, the description "an object-side (or the image-side) surface of a lens element comprises a convex portion (or a concave portion) in a certain region" means the object-side (or image-side) surface of the lens element "protrudes outwardly (or depresses inwardly)" along the direction parallel to the optical axis at the specific region, compared with the outer region radially adjacent to the specific region. As shown in FIG. 1, the axis I represents the optical axis and the lens element is radially symmetric about the axis I. The object-side surface of the lens element comprises a convex portion at the region A, a concave portion at the region B, and another convex portion at the region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

Example embodiments of an optical imaging lens may comprise a first lens element, an aperture stop, a second lens element, a third lens element, a fourth lens element, and a fifth lens element. Each of the lens elements has an object-side surface facing toward the object side and an image-side surface facing toward the image side. These lens elements may be arranged sequentially from an object side to an image side, and example embodiments of the optical imaging lens as a whole may comprise the five lens elements having refractive power. With controlling the convex or concave shape and/or the refractive power characteristics of the surfaces of the lens elements, etc., the length of the optical imaging lens is shortened and meanwhile the good optical character is provided. In an example embodiment: the first lens element has a refractive power, and the object-side surface thereof is a convex surface; the second lens element has a refractive power; the object-side surface of the third lens element comprises a concave portion in a vicinity of the optical axis; the fourth lens element has a positive refractive power, and the object-side surface thereof comprises a convex portion in a vicinity of the optical axis and a concave portion in a vicinity of periphery of the fourth lens element; and the fifth lens element has a refractive power, and the image-side surface thereof comprises a concave portion in a vicinity of the optical axis and a convex portion in a vicinity of a periphery of the fifth lens element.

Each lens element with aforesaid design is considered about the optical characters and the lengths of the optical imaging lens. The object-side surface of the first lens element being a convex surface has better light converge ability, and together with an aperture stop provided at the first lens element and the second lens element could effectively enlarge the field of view of the optical imaging lens and eliminate the optical aberrations. Besides, in conjunction with the object-side surface of the third lens element comprising a concave portion in a vicinity of the optical axis, the fourth lens element having a positive refractive power, the object-side surface of the fourth lens element comprising a convex portion in a vicinity of the optical axis and a concave portion in a vicinity of periphery of the fourth lens element, the fifth lens element having a refractive power, and the image-side surface of the fifth lens element comprising a concave portion in a vicinity of the optical axis and a convex portion in a vicinity of a periphery of the fifth lens element could correct eliminate aberration of the optical imaging lens, and achieve good optical characters.

In another exemplary embodiment, a distance from the image-side surface of the fifth lens element to an image plane along the optical axis defined as a back focal length of the optical imaging lens, BFL, and a central thickness of the fifth lens element along the optical axis, T5, could be controlled to satisfy the equation as follows:

$$2.0 \leq BFL/T5 \quad \text{Equation (1).}$$

In another exemplary embodiment, BFL and an air gap between the second lens element and the third lens element along the optical axis, AG23, could be controlled to satisfy the equation as follows:

$$3.5 \leq BFL/AG23 \quad \text{Equation (2).}$$

Yet, in another exemplary embodiment, the sum of the thickness of all five lens elements along the optical axis, ALT, and a central thickness of the fifth lens element along the optical axis, T5, could be controlled to satisfy the equation as follows:

$$ALT/T5 \leq 10.0 \quad \text{Equation (3).}$$

Yet, in another exemplary embodiment, the sum of all four air gaps from the first lens element to the fifth lens element along the optical axis, AAG, and an air gap between the first lens element and the second lens element along the optical axis, could be controlled to satisfy the equation as follows:

$$AAG/AG12 \leq 8.0 \quad \text{Equation (4).}$$

Yet, in another exemplary embodiment, AG23 and a central thickness of the third lens element along the optical axis, T3, could be controlled to satisfy the equation as follows:

$$0.7 \leq T3/AG23 \quad \text{Equation (5).}$$

Yet, in another exemplary embodiment, BFL and AG12 could be controlled to satisfy the equation as follows:

$$BFL/AG12 \leq 5.0 \quad \text{Equation (6).}$$

Yet, in another exemplary embodiment, T5 and a central thickness of the first lens element along the optical axis, T1, could be controlled to satisfy the equation as follows:

$$T1/T5 \leq 2.0 \quad \text{Equation (7).}$$

Yet, in another exemplary embodiment, T3 and a central thickness of the second lens element along the optical axis, T2, could be controlled to satisfy the equation as follows:

$$1.2 \leq T2/T3 \quad \text{Equation (8).}$$

Yet, in another exemplary embodiment, AG12 and AG23 could be controlled to satisfy the equation as follows:

$$AG23/AG12 \leq 5.0 \quad \text{Equation (9).}$$

Yet, in another exemplary embodiment, BFL and AAG could be controlled to satisfy the equation as follows:

$$1.4 \leq BFL/AAG \quad \text{Equation (10).}$$

Yet, in another exemplary embodiment, BFL and T2 could be controlled to satisfy the equation as follows:

$$BFL/T2 \leq 3.0 \quad \text{Equation (11).}$$

Yet, in another exemplary embodiment, T1 and a central thickness of the fourth lens element along the optical axis, T4, could be controlled to satisfy the equation as follows:

$$1.0 \leq T4/T1 \quad \text{Equation (12).}$$

Yet, in another exemplary, AAG and T4 could be controlled to satisfy the equation as follows:

$$AAG/T4 \leq 2.0 \quad \text{Equation (13).}$$

Yet, in another exemplary, T5 and AG23 could be controlled to satisfy the equation as follows:

$$1.0 \leq T5/AG23 \quad \text{Equation (14).}$$

Still in another exemplary embodiment, T1 and AG23 could be controlled to satisfy the equation as follows:

$$T1/AG12 \leq 2.5 \quad \text{Equation (15).}$$

Aforesaid exemplary embodiments are not limited and could be selectively incorporated in other embodiments described herein.

Reference is now made to Equation (1). Since the image-side surface of the fifth lens element comprises a concave portion in a vicinity of the optical axis, BFL would be enlarged. Foe reducing the total length of the optical imaging lens, BFL and T5 should be shortened as small as possible. BFL and T5 should not be too small; otherwise, the difficulty of fabricating the lens elements is increased. Therefore, the path of light and the difficulty of fabrication should be taken into consideration, and BFL/T5 should be enlarged. When BFL/T5 meets to Equation (1), BFL and T5 could be in proper arrangement, which is favorable for shortening the length of the optical imaging lens. More preferably, the value of BFL/T5 should be further restricted by an upper limit, for example but not limited to, the equation as follows:

$$2.0 \leq BFL/T5 \leq 7.5 \quad \text{Equation (1').}$$

Reference is now made to Equations (2) and (10). Since the image-side surface of the fifth lens element comprises a concave portion in a vicinity of the optical axis, the shortened range of BFL is under a considerable restriction. For reducing the total length of the optical imaging lens, AG23, and AAG should be shortened as small as possible. Therefore, BFL/AG23, and BFL/AAG should be enlarged. When BFL/AG23 meets to Equation (2), BFL and AG23 could be in proper arrangement, which is favorable for shortening the length of the optical imaging lens. More preferably, the value of BFL/AG23 should be further restricted by an upper limit, for example but not limited to, the equation as follows:

$$3.5 \leq BFL/AG23 \leq 8.0 \quad \text{Equation (2').}$$

When BFL/AAG meets to Equation (10), BFL and AAG could be in proper arrangement, which is favorable for shortening the length of the optical imaging lens. More preferably, the value of BFL/AAG should be further restricted by an upper limit, for example but not limited to, the equation as follows:

$$1.4 \leq BFL/AAG \leq 2.5 \quad \text{Equation (10').}$$

Reference is now made to Equation (3). Since the shortened range of ALT should greater than that of any one of the lens elements for shortening the length of the optical imaging lens. Therefore, ALT/T5 should be shortened. When ALT/T5 meets to Equation (3), ALT and T5 could be in proper arrangement, which is favorable for shortening the length of the optical imaging lens. More preferably, the value of ALT/T5 should be further restricted by a lower limit, for example but not limited to, the equation as follows:

$$4.0 \leq ALT/T5 \leq 10.0 \quad \text{Equation (3').}$$

Reference is now made to Equations (4), (6), (9) and (15). If AG12 is maintained at a considerable large value, the emitted light from the first lens element (imaging light) would be adjusted to incident to a proper position on the second lens element, which could provide better image quality. To avoid too small shortened range of AG12 to affect the image quality, AAG/AG12, BFL/AG12, AG23/AG12, and T1/AG12 should be enlarged. When AAG/AG12 meets to Equation (4), AAG and AG12 could be in proper arrangement, which is favorable for shortening the length of the optical imaging lens. More preferably, the value of AAG/AG12 should be further restricted by a lower limit, for example but not limited to, the equation as follows:

$$1.5 \leq AAG/AG12 \leq 8.0 \quad \text{Equation (4')}.$$

When BFL/AG12 meets to Equation (6), BFL and AG12 could be in proper arrangement. More preferably, the value of BFL/AG12 should be further restricted by a lower limit, for example but not limited to, the equation as follows:

$$3.0 \leq BFL/AG12 \leq 5.0 \quad \text{Equation (6')}.$$

When AG23/AG12 meets to Equation (9), AG23 and AG12 could be in proper arrangement. More preferably, the value of AG23/AG12 should be further restricted by a lower limit, for example but not limited to, the equation as follows:

$$0.5 \leq AG23/AG12 \leq 5.0 \quad \text{Equation (9')}.$$

When T1/AG12 meets to Equation (15), T1 and AG12 could be in proper arrangement. More preferably, the value of T1/AG12 should be further restricted by a lower limit, for example but not limited to, the equation as follows:

$$0.5 \leq T1/AG12 \leq 2.5 \quad \text{Equation (15')}.$$

When T3/AG23 meets to Equation (5), T3 and AG23 could be in proper arrangement. More preferably, the value of T3/AG23 should be further restricted by an upper limit, for example but not limited to, the equation as follows:

$$0.7 \leq T3/AG23 \leq 1.5 \quad \text{Equation (5')}.$$

Reference is now made to Equations (7), (12), (13) and (14). Since the fourth lens element and fifth lens element have larger effective optical diameters, the shortened ranges of the central thickness of the fourth lens element along the optical axis, T4, and the central thickness of the fifth lens element along the optical axis, T5, are under considerable restrictions. At the same time, the shortened ranges of T1, AAG, and AG23 are under fewer restrictions. When T1/T5 meets to Equation (7), T1 and T5 could be in proper arrangement. More preferably, the value of T1/T5 should be further restricted by a lower limit, for example but not limited to, the equation as follows:

$$0.5 \leq T1/T5 \leq 2.0 \quad \text{Equation (7')}.$$

When T4/T1 meets to Equation (12), T1 and T4 could be in proper arrangement. More preferably, the value of T4/T1 should be further restricted by an upper limit, for example but not limited to, the equation as follows:

$$1.0 \leq T4/T1 \leq 2.5 \quad \text{Equation (12')}.$$

When AAG/T4 meets to Equation (13), AAG and T4 could be in proper arrangement. More preferably, the value of AAG/T4 should be further restricted by a lower limit, for example but not limited to, the equation as follows:

$$0.5 \leq AAG/T4 \leq 2.0 \quad \text{Equation (13')}.$$

When T5/AG23 meets to Equation (14), T5 and AG23 could be in proper arrangement. More preferably, the value of T5/AG23 should be further restricted by an upper limit, for example but not limited to, the equation as follows:

$$1.0 \leq T5/AG23 \leq 2.0 \quad \text{Equation (14')}.$$

Reference is now made to Equation (8). When T2/T3 meets to Equation (8), T2 and T3 could be in proper arrangement, which could avoid too thin T2 to affect the difficulties of assembling the optical imaging lens, or avoid too thick T3 to enlarge the lens of optical system. More preferably, the value of T2/T3 should be further restricted by an upper limit, for example but not limited to, the equation as follows:

$$1.2 \leq T2/T3 \leq 3.5 \quad \text{Equation (8')}.$$

Reference is now made to Equation (11). When BFL/T2 meets to Equation (11), T2 and BFL could be in proper arrangement, which could avoid too thin T2 to affect the difficulties of assembling the optical imaging lens, or avoid too thick BFL to enlarge the lens of optical system. More preferably, the value of BFL/T2 should be further restricted by a lower limit, for example but not limited to, the equation as follows:

$$1.5 \leq BFL/T2 \leq 3.0 \quad \text{Equation (11')}.$$

When implementing example embodiments, more details about the convex or concave surface structure and/or the refractive power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 2:
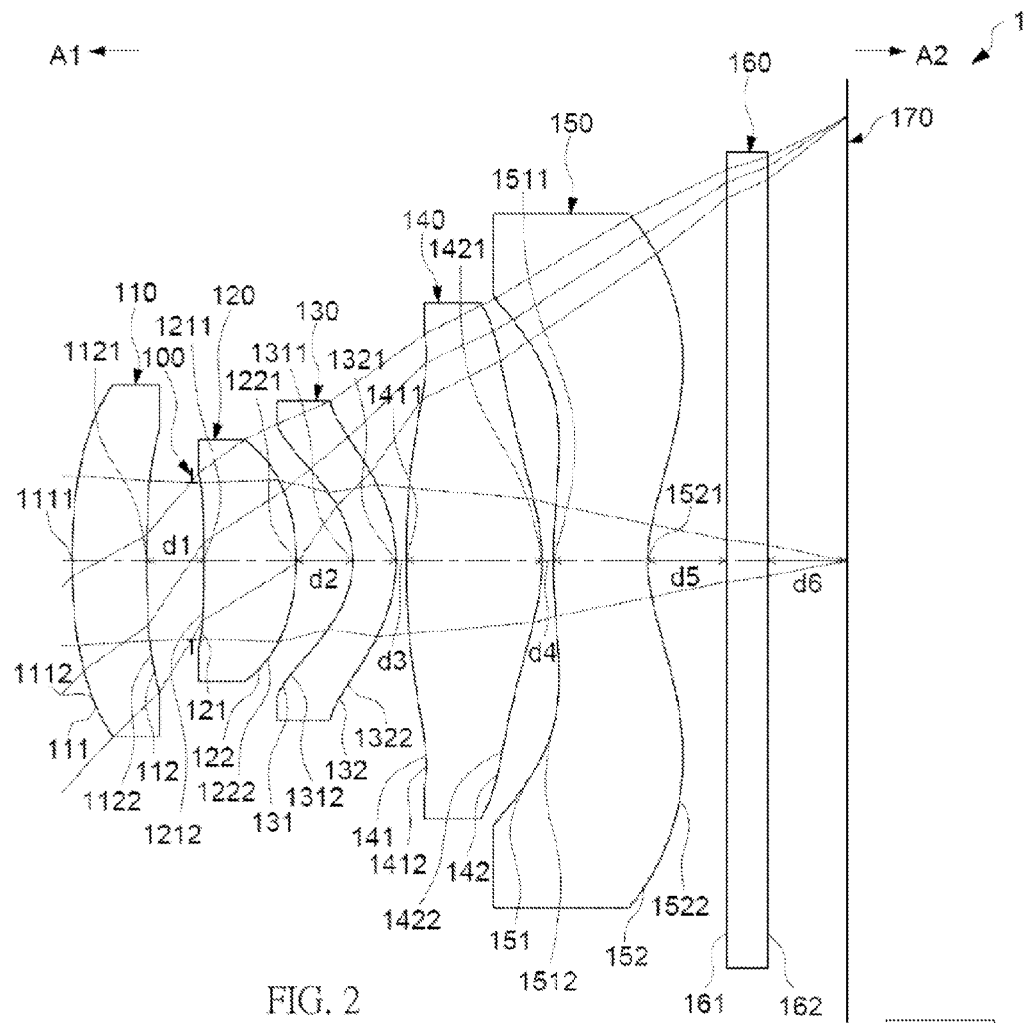
FIG. 2 is a cross-sectional view of a first embodiment of an optical imaging lens having five lens elements according to the present disclosures.
Figure 3:
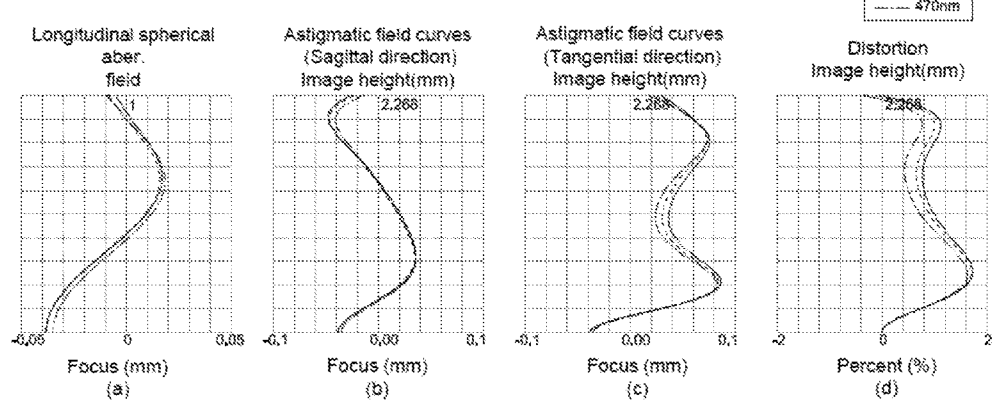
FIG. 3 is a chart of longitudinal spherical aberration and other kinds of optical aberrations of a first embodiment of the optical imaging lens according to the present disclosures.

Several exemplary embodiments and associated optical data will now be provided for illustrating example embodiments of optical imaging lens with good optical quality and a shortened length. Reference is now made to FIGS. 2-5. FIG. 2 illustrates a cross-sectional view of a first embodiment of the optical imaging lens 1 having five lens elements according to the present disclosures. FIGS. 3(*a*) to 3(*d*) show example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2, a first lens element 110, an aperture stop 100, a second lens element 120, a third lens element 130, a fourth lens element 140, and a fifth lens element 150. A filtering unit 160 and an image plane 170 of an image sensor are positioned at the image side A2 of the optical image lens 1. More specifically, the filtering unit 160 is an IR cut filter (infrared cut filter) positioned between the fifth lens 150 and the image plane 170 of the image sensor. The filtering unit 160 selectively absorbs light with specific wavelength from the light passing optical imaging lens 1. For example, IR light is absorbed, and this will prohibit the IR light which is not seen by human eyes from producing an image on the image plane 170.

Exemplary embodiments of each lens elements of the optical imaging lens 1 will now be described with reference to the drawings. Each of the first, second, third, fourth, and fifth lens elements 110, 120, 130, 140, 150 has an object-side surface 111/121/131/141/151 facing toward the object side A1 and an image-side surface 112/122/132/142/152 facing toward the image side A2. Both object-side surface 111/121/131/141/151 and image-side surface 112/122/132/142/152 may be aspherical surfaces.

An example embodiment of the first lens element 110 has a positive refractive power, which may be constructed by plastic material. The object-side surface 111 is a convex surface, and comprises a convex portion 1111 in a vicinity of the optical axis, and a convex portion 1112 in a vicinity of a periphery of the first lens element 110. The image-side surface 112 is a concave surface, and comprises a concave portion 1121 in a vicinity of the optical axis, and a concave portion 1122 in a vicinity of a periphery of the first lens element 110.

The second lens element 120 has a positive refractive power, which may be constructed by plastic material. The object-side surface 121 is a concave surface, and comprises a concave portion 1211 in a vicinity of the optical axis, and a concave portion 1212 in a vicinity of a periphery of the second lens element 120. The image-side surface 122 is a convex surface, and comprises a convex portion 1221 in a vicinity of the optical axis, and a convex portion 1222 in a vicinity of a periphery of the second lens element 120.

The third lens element 130 has a negative refractive power, which may be constructed by plastic material. The object-side surface 131 is a concave surface, and the image-side surface 132 is a convex surface. The object-side surface 131 comprises a concave portion 1311 in a vicinity of the optical axis and a concave portion 1312 in a vicinity of a periphery of the third lens element 130. The image-side surface 132 comprises a convex portion 1321 in a vicinity of the optical axis, and a convex portion 1322 in a vicinity of a periphery of the third lens element 130.

The fourth lens element 140 has a positive refractive power, which may be constructed by plastic material. The image-side surface 142 is a convex surface. The object-side surface 141 comprises a convex portion 1411 in a vicinity of the optical axis, and a concave portion 1412 in a vicinity of a periphery of the fourth lens element 140. The image-side surface 142 comprises a convex portion 1421 in a vicinity of the optical axis, and a convex portion 1422 in a vicinity of a periphery of the fourth lens element 140.

The fifth lens element 150 has a negative refractive power, which may be constructed by plastic material. The object-side surface 151 comprises a convex portion 1511 in a vicinity of the optical axis, and a concave portion 1512 in a vicinity of a periphery of the fifth lens element 150. The image-side surface 152 comprises a concave portion 1521 in a vicinity of the optical axis, and a convex portion 1522 in a vicinity of a periphery of the fifth lens element 150.

In example embodiments, air gaps exist between the lens elements 110-150, the filtering unit 160, and the image plane 170 of the image sensor. For example, FIG. 2 illustrates the air gap d1 existing between the first lens element 110 and the second lens element 120, the air gap d2 existing between the second lens element 120 and the third lens element 130, the air gap d3 existing between the third lens element 130 and the fourth lens element 140 the air gap d4 existing between the fourth lens element 140 and the fifth lens element 150, the air gap d5 existing between the fifth lens element 150 and the filtering unit 160, and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gaps may not exist. The air gap d1 is denoted by G12, the air gap d2 is denoted by G23, the air gaps d3 is denoted by G34, the air d4 gap is denoted by G45, and the sum of all air gaps d1, d2, d3, d4 between the first though fifth lens elements is denoted by AAG.

FIG. 4 depicts the optical characteristics of each lens elements in the optical imaging lens 1 and thicknesses of the air gaps of the present embodiment, in which the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 are:

BFL/T5=2.103, satisfying Equation (1), and (1');

BFL/AG23=3.506, satisfying Equation (2), and (2');

ALT/T5=4.662, satisfying Equation (3), and (3');

AAG/AG12=2.354, satisfying Equation (4), and (4');

T3/AG23=0.761, satisfying Equation (5), and (5');

BFL/AG12=3.482, satisfying Equation (6), and (6');

T1/T5=0.788, satisfying Equation (7), and (7');

T2/T3=2.139, satisfying Equation (8), and (8');

AG23/AG12=0.993, satisfying Equation (9), and (9');

BFL/AAG=1.479, satisfying Equation (10), and (10');

BFL/T2=2.153, satisfying Equation (11), and (11');

T4/T1=1.827, satisfying Equation (12), and (12');

AAG/T4=0.987, satisfying Equation (13), and (13');

T5/AG23=1.667, satisfying Equation (14), and (14'); and

T1/AG12=1.306, satisfying Equation (15), and (15').

The aspherical surfaces, including the object-side surfaces 111, 121, 131, 141, 151 and the image-side surfaces 112, 122, 132, 142, 152 are all defined by the following aspherical formula:

$$Z(Y) = \frac{Y^2}{R} \Bigg/ \left(1 + \sqrt{1 - (1+K)\frac{Y^2}{R^2}}\right) + \sum_{i=1}^{n} a_{2i} \times Y^{2i}$$

wherein,

R represents the radius of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents a aspherical coefficient of $2i^{th}$ order.

The values of each aspherical parameter, K, and $a_{2i}$ of each lens element 110, 120, 130, 140, 150 are represented in FIG. 5.

FIG. 3(*a*) illustrates the longitudinal spherical aberration of the present embodiment, in which curves of different wavelengths are distributed closely, that means the off-axis light with different height of different wavelengths converge in a vicinity of the imaging point. FIG. 3(*a*) shows that the offsets between the off-axis light with different light and the imaging point are controlled to be ±0.04 mm. Therefore, the present embodiment improves the spherical aberration in different wavelengths obviously. Additionally, the distances between the three represented wavelengths are quite close, that means the image positions of the different wavelengths converge with one another, such that the chromatic aberration is improved obviously.

FIG. 3(*b*) illustrates an astigmatism aberration in the sagittal direction of the present embodiment, and FIG. 3(*c*) illustrates an astigmatism aberration in the tangential direction of the present embodiment. The focal lengths of the three represented wavelengths in the whole field of view are within ±0.10 mm. Therefore, the optical imaging lens 1 of the present embodiment could eliminate the aberration effectively. Additionally, the distances between the three represented wavelengths are quite close, that means the aberration is improved obviously.

FIG. 3(*d*) illustrates a distortion aberration of the present embodiment. The distortion aberration of the present embodiment is maintained within the range of ±2%, that means the distortion aberration meets the image quality of optical system. Accordingly, the system length of the optical imaging lens 1 is shortened to be less than 4.00 mm approximately, and HFOV is reached 47 degrees, which could overcome the chromatic aberration and provide better image quality. Therefore, the present embodiment achieves great optical performance and the length of the optical imaging lens 1 is effectively shortened.

Figure 6:
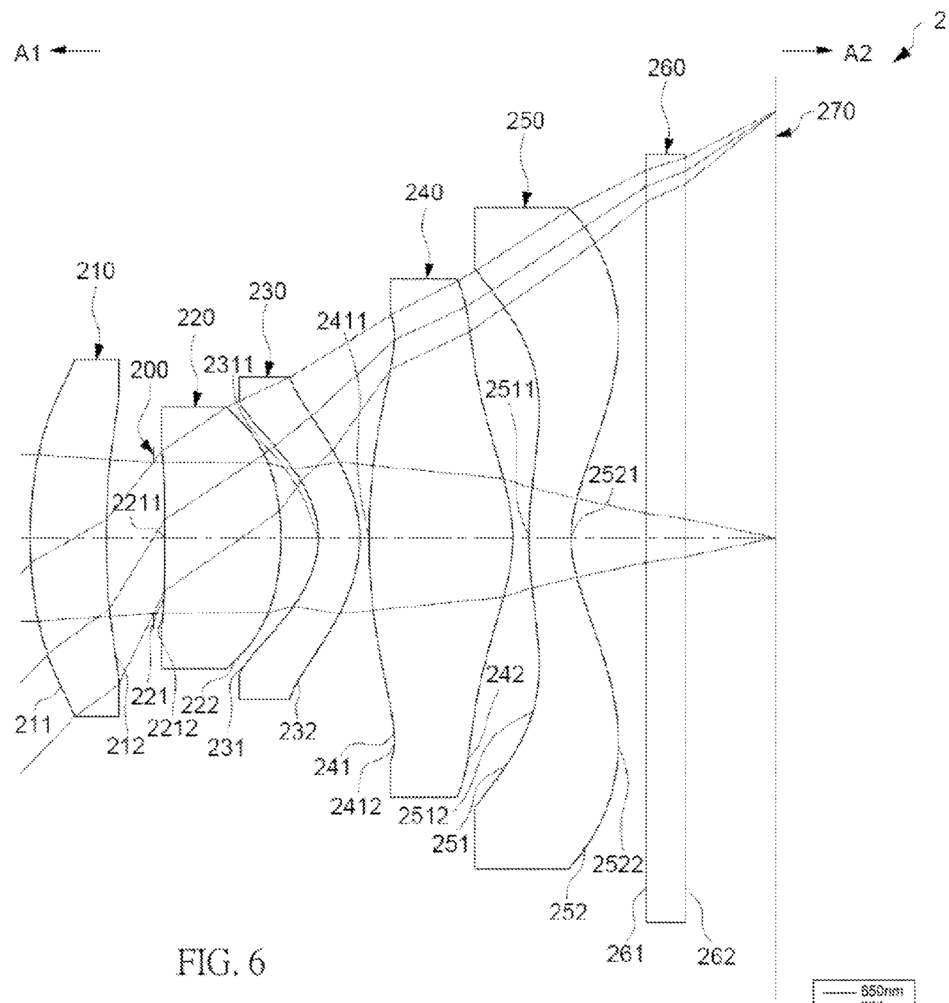
FIG. 6 is a cross-sectional view of a second embodiment of an optical imaging lens having five lens elements according to the present disclosures.
Figure 7:
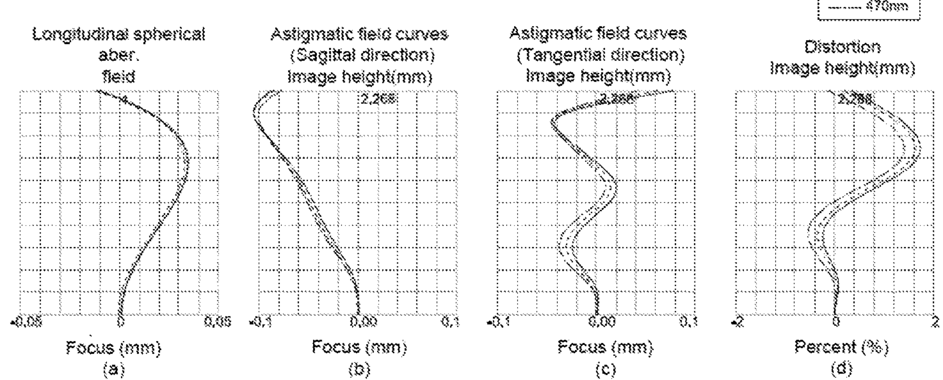
FIG. 7 is a chart of longitudinal spherical aberration and other kinds of optical aberrations of a second embodiment of the optical imaging lens according to the present disclosures.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the second embodiment is similar to the first embodiment. The optical imaging lens 2, in an order from an object side A1 to an image side A2, comprises an aperture stop 200, first lens element to fifth lens element 210-250. A filtering unit 260 and an image plane 270 of an image sensor are positioned at the image side A2 of the optical imaging lens 2. The arrangement of the convex or concave surface structures, including the object-side surfaces 211, 221, 231, 241, 251 and image-side surfaces 212, 222, 232, 242, 252 are generally same with the optical imaging lens 1. The difference between the optical imaging lens 1 and the optical imaging lens 2 is the radius of curvature, EFL, the values of the central thicknesses of the lens elements 210-250 and the air gaps between the lens elements 210-250 are slight different from the values of the optical imaging lens 1. Besides, the second lens element 220 is slight different from that in the first embodiment. More specifically, the object-side surface 221 comprises a convex portion 2211 in a vicinity of the optical axis, and a concave portion 2212 in a vicinity of a periphery of the second lens element 220.

Please refer to FIG. 8 for the optical characteristics of each lens elements in the optical imaging lens 2 and thicknesses of the air gaps of the present embodiment, in which the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 are:

BFL/T5=4.885, satisfying Equation (1), and (1');
BFL/AG23=5.487, satisfying Equation (2), and (2');
ALT/T5=9.994, satisfying Equation (3), and (3');
AAG/AG12=2.079, satisfying Equation (4), and (4');
T3/AG23=1.108, satisfying Equation (5), and (5');
BFL/AG12=3.513, satisfying Equation (6), and (6');
T1/T5=1.810, satisfying Equation (7), and (7');
T2/T3=2.806, satisfying Equation (8), and (8');
AG23/AG12=0.640, satisfying Equation (9), and (9');
BFL/AAG=1.690, satisfying Equation (10), and (10');
BFL/T2=1.765, satisfying Equation (11), and (11');
T4/T1=1.896, satisfying Equation (12), and (12');
AAG/T4=0.843, satisfying Equation (13), and (13');
T5/AG23=1.123, satisfying Equation (14), and (14'); and
T1/AG12=1.301, satisfying Equation (15), and (15').

As shown in FIGS. 7(*a*)-7(*d*), the optical imaging lens 2 of the present embodiment shows great characteristics in longitudinal spherical aberration 7(*a*), astigmatism in the sagittal direction 7(*b*), astigmatism in the tangential direction 7(*c*), and distortion aberration 7(*d*). Therefore, according to the above illustration, the optical imaging lens of the present embodiment indeed shows great optical performance and the length of the optical imaging lens 2 is effectively shortened. Accordingly, the system length of the optical imaging lens 2 is shortened to be less than 4.00 mm approximately, and HFOV is reached 47 degrees, which could overcome the chromatic aberration and provide better image quality. Therefore, the present embodiment achieves great optical performance and the length of the optical imaging lens 2 is effectively shortened.

Figure 10:
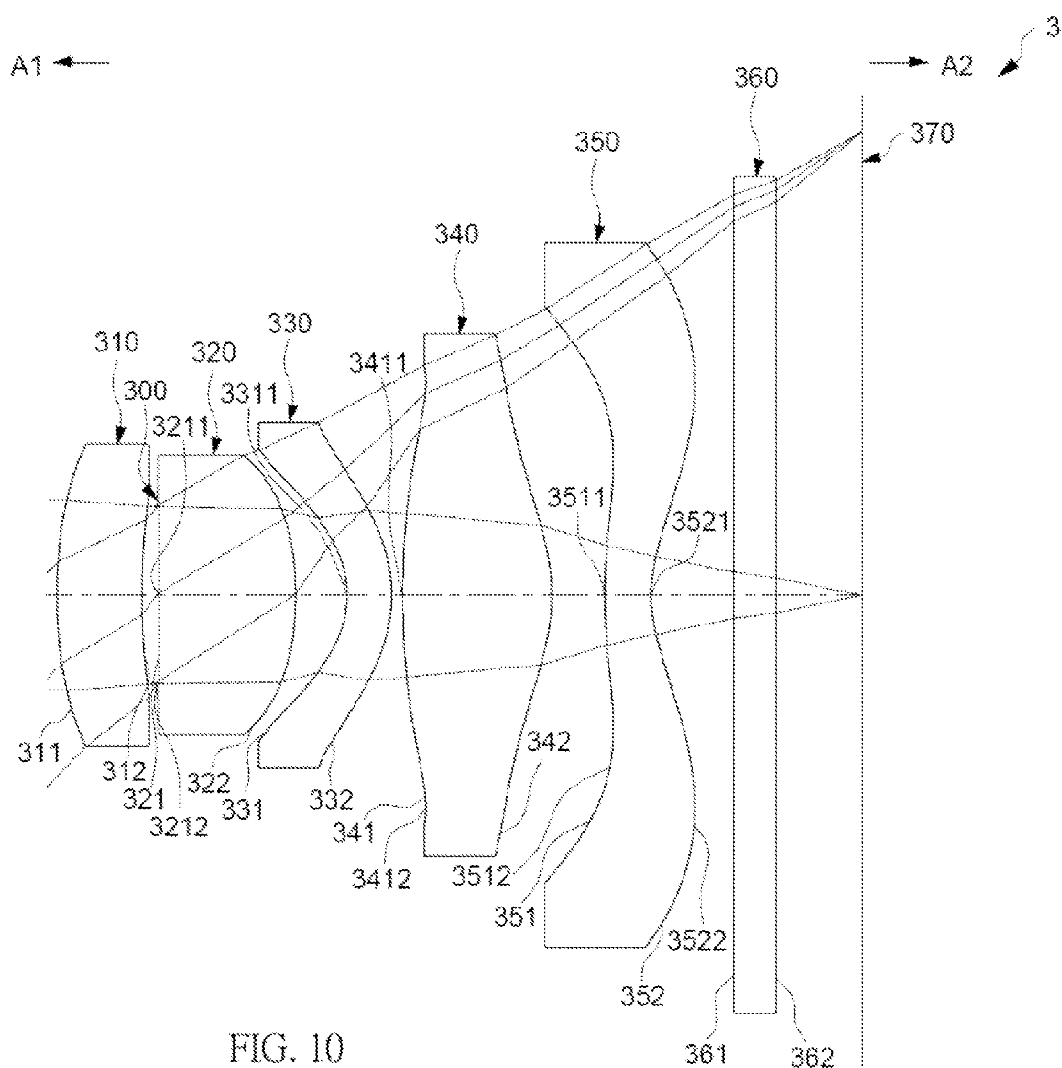
FIG. 10 is a cross-sectional view of a third embodiment of an optical imaging lens having five lens elements according to the present disclosures.
Figure 11:
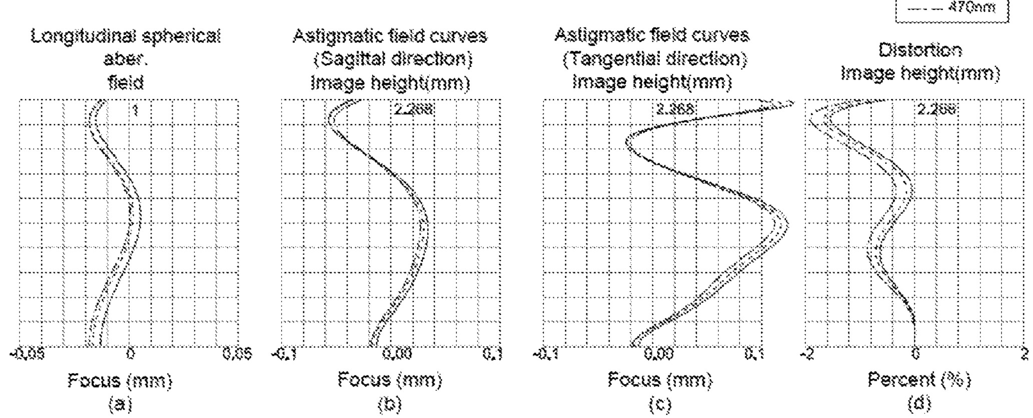
FIG. 11 is a chart of longitudinal spherical aberration and other kinds of optical aberrations of a third embodiment of the optical imaging lens according the present disclosures.

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the third embodiment is similar to the first embodiment. The optical imaging lens 3, in an order from an object side A1 to an image side A2, comprises an aperture stop 300, first lens element to fifth lens element 310-350. A filtering unit 360 and an image plane 370 of an image sensor are positioned at the image side A2 of the optical imaging lens 3. The arrangement of the convex or concave surface structures, including the object-side surfaces 311, 321, 331, 341, 351 and image-side surfaces 312, 322, 332, 342, 352 are generally same with the optical imaging lens 1. The difference between the optical imaging lens 1 and the optical imaging lens 3 is the radius of curvature, EFL, the values of the central thicknesses of the lens elements 310-350 and the air gaps between the lens elements 310-350 are slight different from the values of the optical imaging lens 1. Besides, the second lens element 320 is slight different from that in the first embodiment. More specifically, the object-side surface 321 comprises a convex portion 3211 in a vicinity of the optical axis, and a concave portion 3212 in a vicinity of a periphery of the second lens element 320.

Please refer to FIG. 12 for the optical characteristics of each lens elements in the optical imaging lens 3 and thicknesses of the air gaps of the present embodiment, in which the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 are:

BFL/T5=4.547, satisfying Equation (1), and (1');
BFL/AG23=4.096, satisfying Equation (2), and (2');
ALT/T5=9.951, satisfying Equation (3), and (3');
AAG/AG12=7.944, satisfying Equation (4), and (4');
T3/AG23=0.863, satisfying Equation (5), and (5');
BFL/AG12=12.737;
T1/T5=1.834, satisfying Equation (7), and (7');
T2/T3=3.075, satisfying Equation (8), and (8');
AG23/AG12=3.110, satisfying Equation (9), and (9');
BFL/AAG=1.603, satisfying Equation (10), and (10');
BFL/T2=1.544, satisfying Equation (11), and (11');
T4/T1=1.752, satisfying Equation (12), and (12');

AAG/T4=0.883, satisfying Equation (13), and (13');

T5/AG23=0.901; and

T1/AG12=5.138

As shown in FIGS. 11(*a*)-11(*d*), the optical imaging lens 3 of the present embodiment shows great characteristics in longitudinal spherical aberration 11(*a*), astigmatism in the sagittal direction 11(*b*), astigmatism in the tangential direction 11(*c*), and distortion aberration 11(*d*). Therefore, according to the above illustration, the optical imaging lens of the present embodiment indeed shows great optical performance and the length of the optical imaging lens 3 is effectively shortened. Accordingly, the system length of the optical imaging lens 3 is shortened to be less than 4.00 mm approximately, and HFOV is reached 45 degrees, which could overcome the chromatic aberration and provide better image quality. Therefore, the present embodiment achieves great optical performance and the length of the optical imaging lens 3 is effectively shortened.

Figure 14:
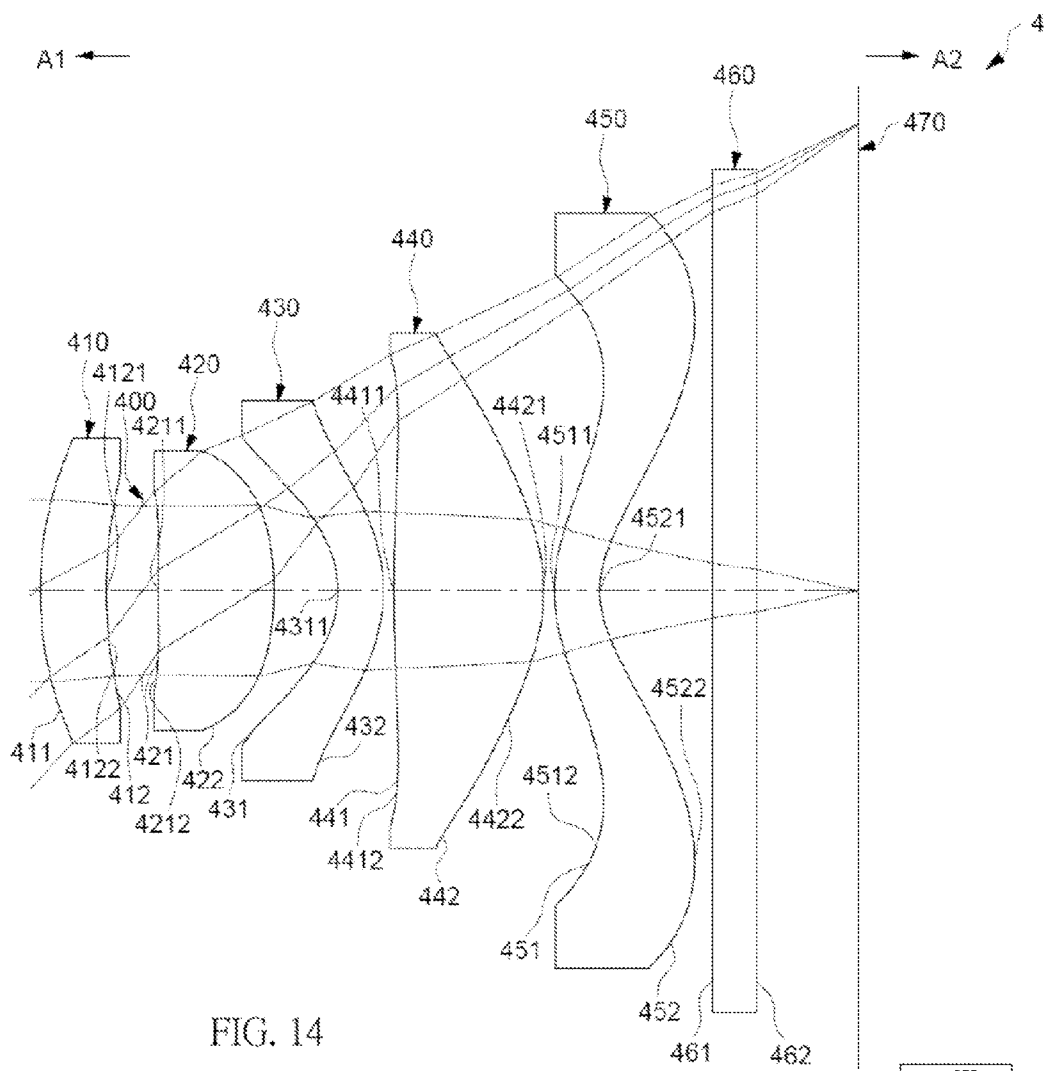
FIG. 14 is a cross-sectional view of a fourth embodiment of an optical imaging lens having five lens elements according to the present disclosures.
Figure 15:
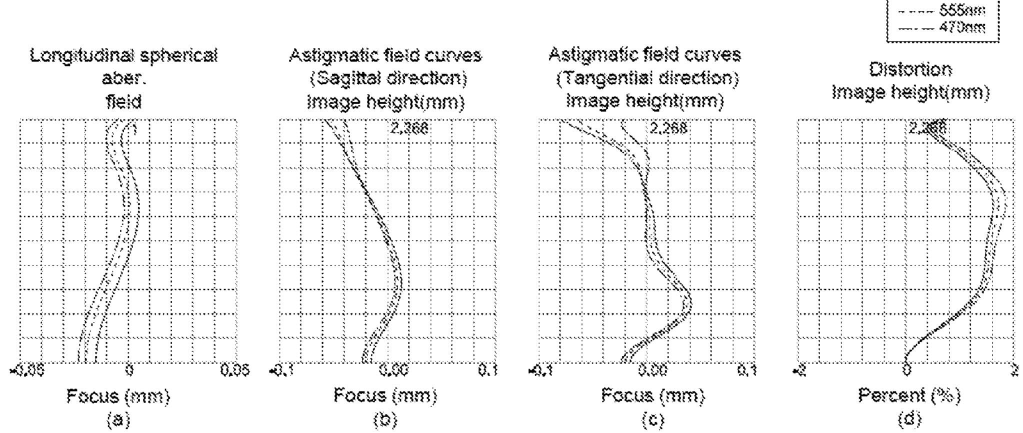
FIG. 15 is a chart of longitudinal spherical aberration and other kinds of optical aberrations of a fourth embodiment of the optical imaging lens according the present disclosures.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to the fourth example embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the fourth embodiment is similar to the first embodiment. The optical imaging lens 4, in an order from an object side A1 to an image side A2, comprises an aperture stop 400, first lens element to fifth lens element 410-450. A filtering unit 460 and an image plane 470 of an image sensor are positioned at the image side A2 of the optical imaging lens 4. The arrangement of the convex or concave surface structures, including the object-side surfaces 411, 421, 431, 441, 451 and image-side surfaces 412, 422, 432, 442, 452 are generally same with the optical imaging lens 1. The difference between the optical imaging lens 1 and the optical imaging lens 4 is the radius of curvature, EFL, the values of the central thicknesses of the lens elements 410-450 and the air gaps between the lens elements 410-450 are slight different from the values of the optical imaging lens 1.

Please refer to FIG. 16 for the optical characteristics of each lens elements in the optical imaging lens 4 and thicknesses of the air gaps of the present embodiment, in which the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 are:

BFL/T5=5.702, satisfying Equation (1), and (1');

BFL/AG23=4.048, satisfying Equation (2), and (2');

ALT/T5=9.317, satisfying Equation (3), and (3');

AAG/AG12=2.630, satisfying Equation (4), and (4');

T3/AG23=0.710, satisfying Equation (5), and (5');

BFL/AG12=4.990, satisfying Equation (6), and (6');

T1/T5=1.455, satisfying Equation (7), and (7');

T2/T3=2.551, satisfying Equation (8), and (8');

AG23/AG12=1.233, satisfying Equation (9), and (9');

BFL/AAG=1.897, satisfying Equation (10), and (10');

BFL/T2=2.235, satisfying Equation (11), and (11');

T4/T1=2.275, satisfying Equation (12), and (12');

AAG/T4=0.908, satisfying Equation (13), and (13');

T5/AG23=0.710; and

T1/AG12=1.274, satisfying Equation (15), and (15').

As shown in FIGS. 15(*a*)-15(*d*), the optical imaging lens 4 of the present embodiment shows great characteristics in longitudinal spherical aberration 15(*a*), astigmatism in the sagittal direction 15(*b*), astigmatism in the tangential direction 15(*c*), and distortion aberration 15(*d*). Therefore, according to the above illustration, the optical imaging lens of the present embodiment indeed shows great optical performance and the length of the optical imaging lens 4 is effectively shortened. Accordingly, the system length of the optical imaging lens 4 is shortened to be less than 4.00 mm approximately, and HFOV is reached 47 degrees, which could overcome the chromatic aberration and provide better image quality. Therefore, the present embodiment achieves great optical performance and the length of the optical imaging lens 4 is effectively shortened.

Figure 18:
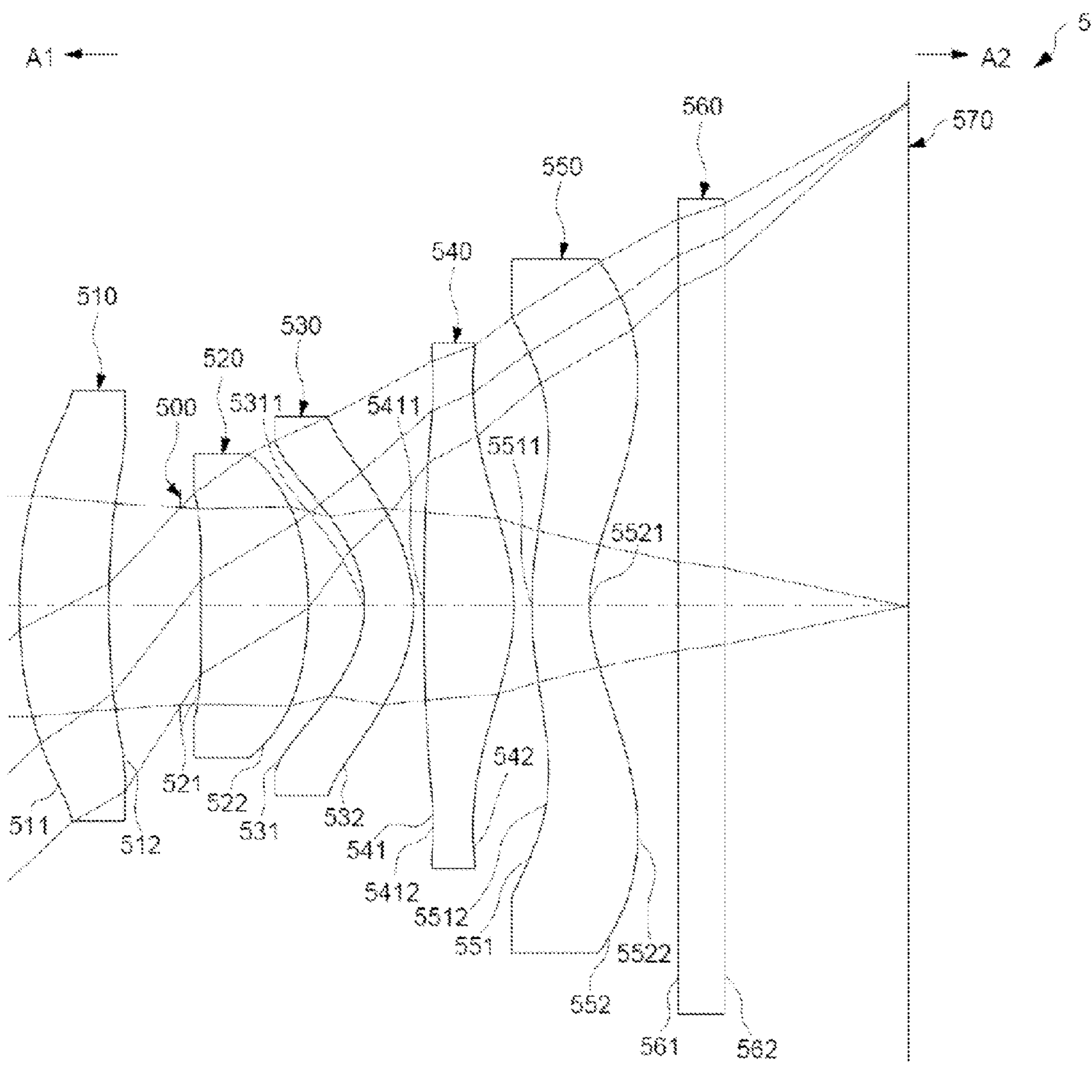
FIG. 18 is a cross-sectional view of a fifth embodiment of an optical imaging lens having five lens elements according to the present disclosures.
Figure 19:
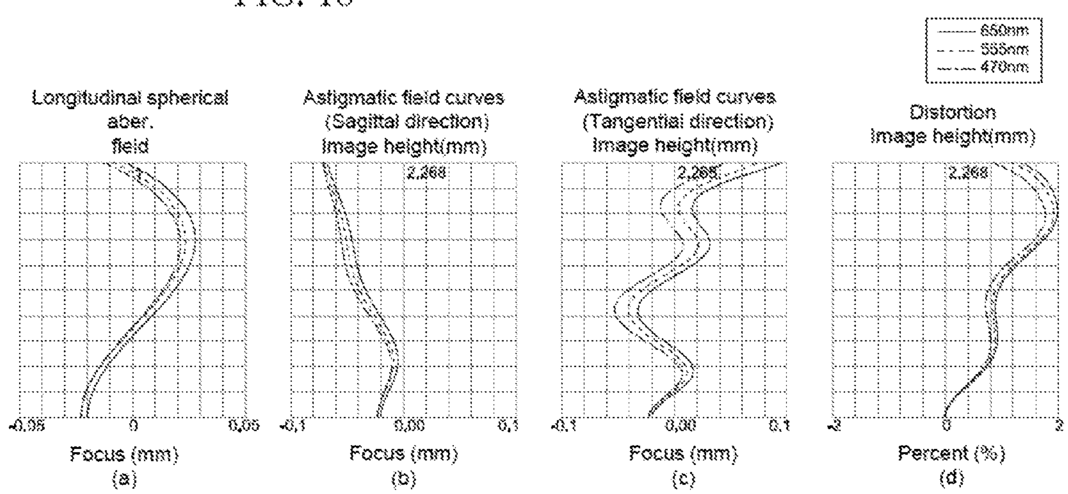
FIG. 19 is a chart of longitudinal spherical aberration and other kinds of optical aberrations of a fifth embodiment of the optical imaging lens according the present disclosures.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to the fifth example embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the fifth embodiment is similar to the first embodiment. The optical imaging lens 5, in an order from an object side A1 to an image side A2, comprises an aperture stop 500, first lens element to fifth lens element 510-550. A filtering unit 560 and an image plane 570 of an image sensor are positioned at the image side A2 of the optical imaging lens 5. The arrangement of the convex or concave surface structures, including the object-side surfaces 511, 521, 531, 541, 551 and image-side surfaces 512, 522, 532, 542, 552 are generally same with the optical imaging lens 1. The difference between the optical imaging lens 1 and the optical imaging lens 5 is the radius of curvature, EFL, the values of the central thicknesses of the lens elements 510-550 and the air gaps between the lens elements 510-550 are slight different from the values of the optical imaging lens 1. Besides, the first lens element 510 and the fourth lens element 540 are slight different from that in the first embodiment. More specifically, the image-side surface 512 comprises a concave portion 5121 in a vicinity of the optical axis, and a convex portion 5122 in a vicinity of a periphery of the first lens element 510; the image-side surface 542 comprises a convex portion 5421 in a vicinity of the optical axis, and a concave portion 5422 in a vicinity of a periphery of the fourth lens element 540.

Please refer to FIG. 20 for the optical characteristics of each lens elements in the optical imaging lens 5 and thicknesses of the air gaps of the present embodiment, in which the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 are:

BFL/T5=5.574, satisfying Equation (1), and (1');
BFL/AG23=5.648, satisfying Equation (2), and (2');
ALT/T5=6.852, satisfying Equation (3), and (3');
AAG/AG12=1.924, satisfying Equation (4), and (4');
T3/AG23=0.863, satisfying Equation (5), and (5');
BFL/AG12=3.457, satisfying Equation (6), and (6');
T1/T5=1.569, satisfying Equation (7), and (7');
T2/T3=2.186, satisfying Equation (8), and (8');
AG23/AG12=0.612, satisfying Equation (9), and (9');
BFL/AAG=1.796, satisfying Equation (10), and (10');
BFL/T2=2.993, satisfying Equation (11), and (11');
T4/T1=1.000, satisfying Equation (12), and (12');
AAG/T4=1.978, satisfying Equation (13), and (13');
T5/AG23=1.013, satisfying Equation (14), and (14'); and
T1/AG12=0.973, satisfying Equation (15), and (15').

As shown in FIGS. 19(*a*)-19(*d*), the optical imaging lens 5 of the present embodiment shows great characteristics in longitudinal spherical aberration 19(*a*), astigmatism in the sagittal direction 19(*b*), astigmatism in the tangential direction 19(*c*), and distortion aberration 19(*d*). Therefore, according to the above illustration, the optical imaging lens of the present embodiment indeed shows great optical performance and the length of the optical imaging lens 5 is effectively shortened. Accordingly, the system length of the optical imaging lens 5 is shortened to be less than 4.00 mm approximately, and HFOV is reached 43 degrees, which could overcome the chromatic aberration and provide better image quality. Therefore, the present embodiment achieves great optical performance and the length of the optical imaging lens 65 is effectively shortened.

Figure 22:
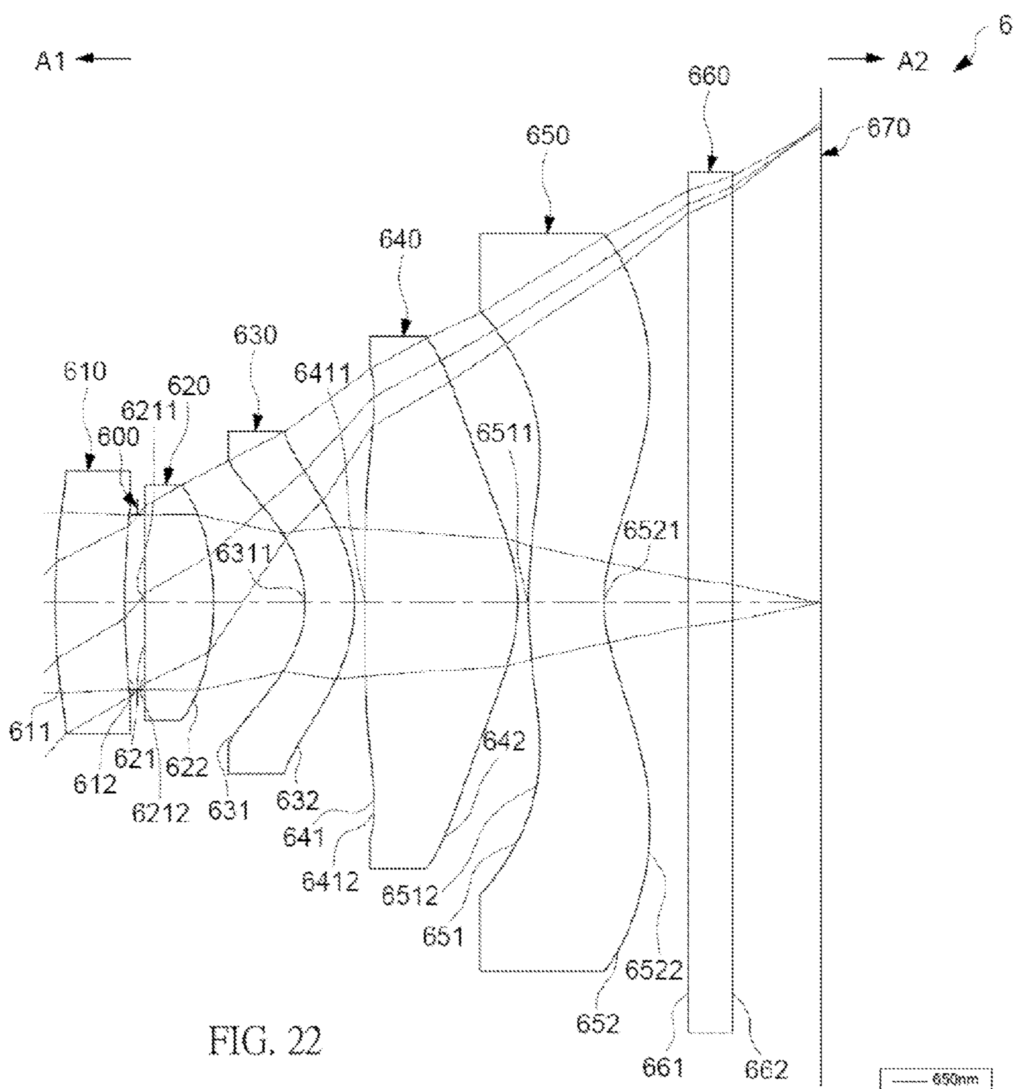
FIG. 22 is a cross-sectional view of a sixth embodiment of an optical imaging lens having five lens elements according to the present disclosures.
Figure 23:
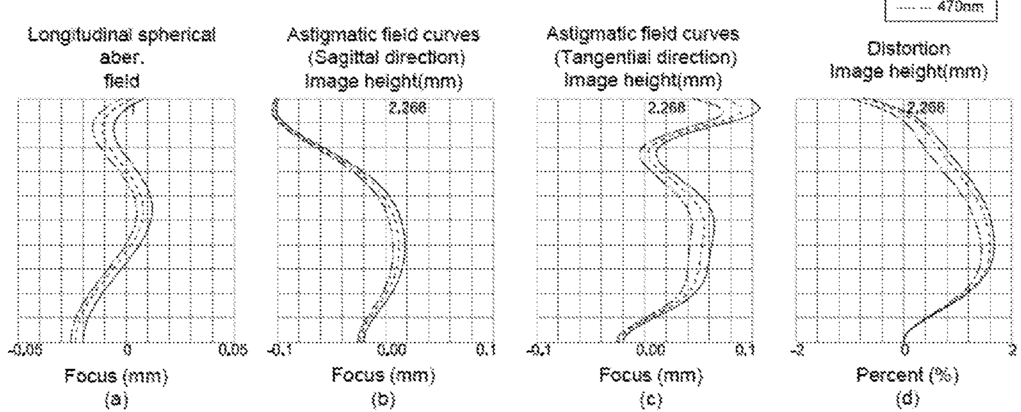
FIG. 23 is a chart of longitudinal spherical aberration and other kinds of optical aberrations of a sixth embodiment of the optical imaging lens according the present disclosures.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to the sixth example embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the sixth embodiment is similar to the first embodiment. The optical imaging lens 6, in an order from an object side A1 to an image side A2, comprises an aperture stop 600, first lens element to fifth lens element 610-650. A filtering unit 660 and an image plane 670 of an image sensor are positioned at the image side A2 of the optical imaging lens 6. The arrangement of the convex or concave surface structures, including the object-side surfaces 611, 621, 631, 641, 651 and image-side surfaces 612, 622, 632, 642, 652 are generally same with the optical imaging lens 1. The difference between the optical imaging lens 1 and the optical imaging lens 6 is the radius of curvature, EFL, the values of the central thicknesses of the lens elements 610-650 and the air gaps between the lens elements 610-650 are slight different from the values of the optical imaging lens 1. Besides, the second lens element 620 is slight different from that in the first embodiment. More specifically, the object-side surface 621 comprises a convex portion 6211 in a vicinity of the optical axis, and a concave portion 6212 in a vicinity of a periphery of the second lens element 620.

Please refer to FIG. 24 for the optical characteristics of each lens elements in the optical imaging lens 6 and thicknesses of the air gaps of the present embodiment, in which the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 are:

BFL/T5=2.873, satisfying Equation (1), and (1');
BFL/AG23=2.361;
ALT/T5=5.512, satisfying Equation (3), and (3');
AAG/AG12=6.602, satisfying Equation (4), and (4');
T3/AG23=0.535, satisfying Equation (5), and (5');
BFL/AG12=10.764;
T1/T5=0.924, satisfying Equation (7), and (7');
T2/T3=1.394, satisfying Equation (8), and (8');
AG23/AG12=4.560, satisfying Equation (9), and (9');
BFL/AAG=1.630, satisfying Equation (10), and (10');
BFL/T2=3.164;
T4/T1=2.195, satisfying Equation (12), and (12');
AAG/T4=0.869, satisfying Equation (13), and (13');
T5/AG23=0.822; and
T1/AG12=3.461.

As shown in FIGS. 23(*a*)-23(*d*), the optical imaging lens 6 of the present embodiment shows great characteristics in longitudinal spherical aberration 23(*a*), astigmatism in the sagittal direction 23(*b*), astigmatism in the tangential direction 23(*c*), and distortion aberration 23(*d*). Therefore, according to the above illustration, the optical imaging lens of the present embodiment indeed shows great optical performance and the length of the optical imaging lens 6 is effectively shortened. Accordingly, the system length of the optical imaging lens 6 is shortened to be less than 4.00 mm approximately, and HFOV is reached 47 degrees, which could overcome the chromatic aberration and provide better image quality. Therefore, the present embodiment achieves great optical performance and the length of the optical imaging lens 6 is effectively shortened.

Figure 26:
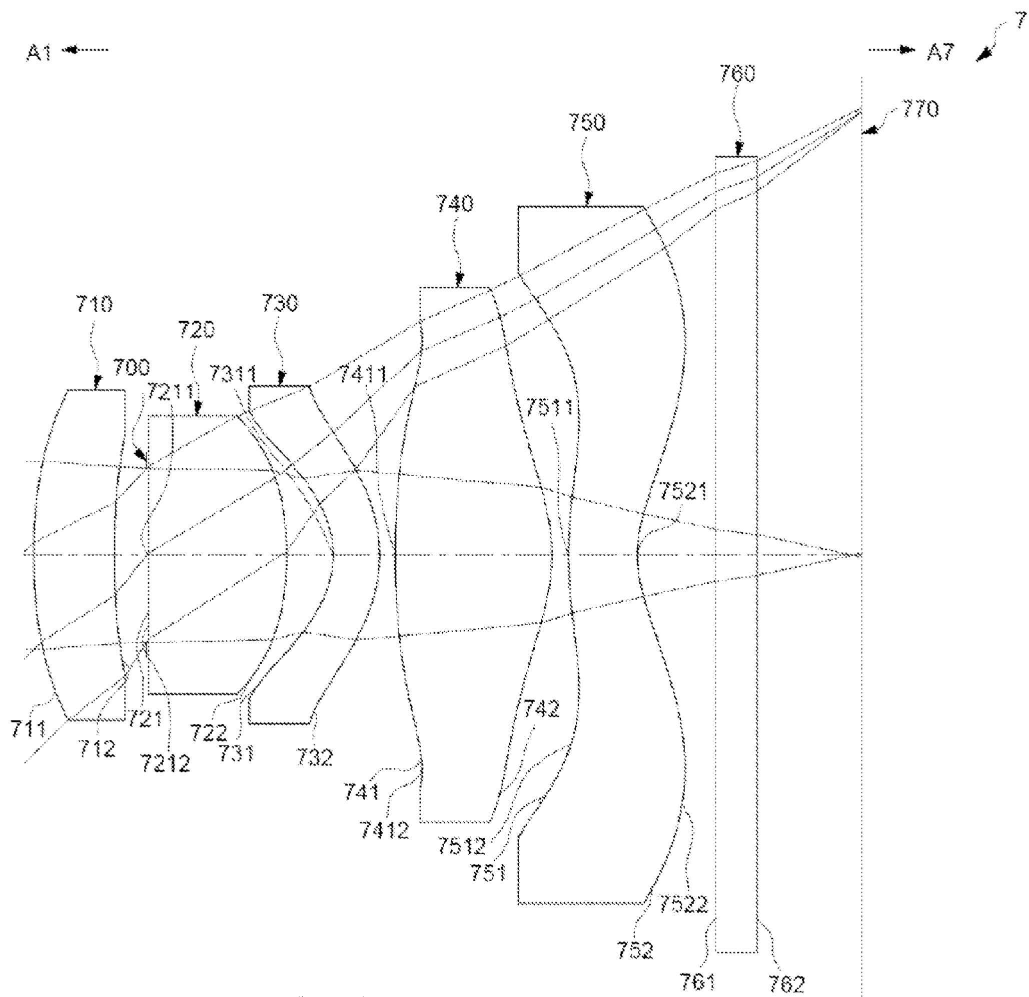
FIG. 26 is a cross-sectional view of a seventh embodiment of an optical imaging lens having five lens elements according to the present disclosures.
Figure 27:
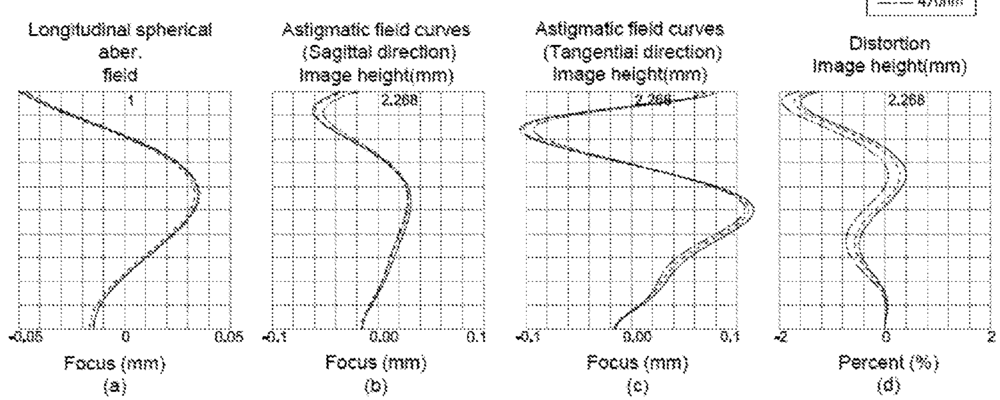
FIG. 27 is a chart of longitudinal spherical aberration and other kinds of optical aberrations of a seventh embodiment of the optical imaging lens according the present disclosures.

Reference is now made to FIGS. 26-29. FIG. 26 illustrates an example cross-sectional view of an optical imaging lens 7 having five lens elements of the optical imaging lens according to a seventh example embodiment. FIG. 27 shows example charts of longitudinal spherical aberration and other kinds of optical aberrations of the optical imaging lens 7 according to the seventh example embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the seventh embodiment is similar to the first embodiment. The optical imaging lens 7, in an order from an object side A1 to an image side A2, comprises an aperture stop 700, first lens element to fifth lens element 710-750. A filtering unit 760 and an image plane 770 of an image sensor are positioned at the image side A2 of the optical imaging lens 7. The arrangement of the convex or concave surface structures, including the object-side surfaces 711,

721, 731, 741, 751 and image-side surfaces 712, 722, 732, 742, 752 are generally same with the optical imaging lens 1. The difference between the optical imaging lens 1 and the optical imaging lens 7 is the radius of curvature, EFL, the values of the central thicknesses of the lens elements 710-750 and the air gaps between the lens elements 710-750 are slight different from the values of the optical imaging lens 1. Besides, the second lens element 720 is slight different from that in the first embodiment. More specifically, the object-side surface 721 comprises a convex portion 7211 in a vicinity of the optical axis, and a concave portion 7212 in a vicinity of a periphery of the second lens element 720.

Please refer to FIG. 28 for the optical characteristics of each lens elements in the optical imaging lens 7 and thicknesses of the air gaps of the present embodiment, in which the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 are:

BFL/T5=3.250, satisfying Equation (1), and (1');
BFL/AG23=4.829, satisfying Equation (2), and (2');
ALT/T5=7.124, satisfying Equation (3), and (3');
AAG/AG12=3.335, satisfying Equation (4), and (4');
T3/AG23=1.002, satisfying Equation (5), and (5');
BFL/AG12=6.694;
T1/T5=1.170, satisfying Equation (7), and (7');
T2/T3=2.980, satisfying Equation (8), and (8');
AG23/AG12=1.386, satisfying Equation (9), and (9');
BFL/AAG=2.007, satisfying Equation (10), and (10');
BFL/T2=1.618, satisfying Equation (11), and (11');
T4/T1=1.941, satisfying Equation (12), and (12');
AAG/T4=0.713, satisfying Equation (13), and (13');
T5/AG23=1.486, satisfying Equation (14), and (14'); and
T1/AG12=2.409, satisfying Equation (15), and (15').

As shown in FIGS. 27(*a*)-27(*d*), the optical imaging lens 7 of the present embodiment shows great characteristics in longitudinal spherical aberration 27(*a*), astigmatism in the sagittal direction 27(*b*), astigmatism in the tangential direction 27(*c*), and distortion aberration 27(*d*). Therefore, according to the above illustration, the optical imaging lens of the present embodiment indeed shows great optical performance and the length of the optical imaging lens 7 is effectively shortened. Accordingly, the system length of the optical imaging lens 7 is shortened to be less than 4.50 mm approximately, and HFOV is reached 45 degrees, which could overcome the chromatic aberration and provide better image quality. Therefore, the present embodiment achieves great optical performance and the length of the optical imaging lens 7 is effectively shortened.

Figure 30:
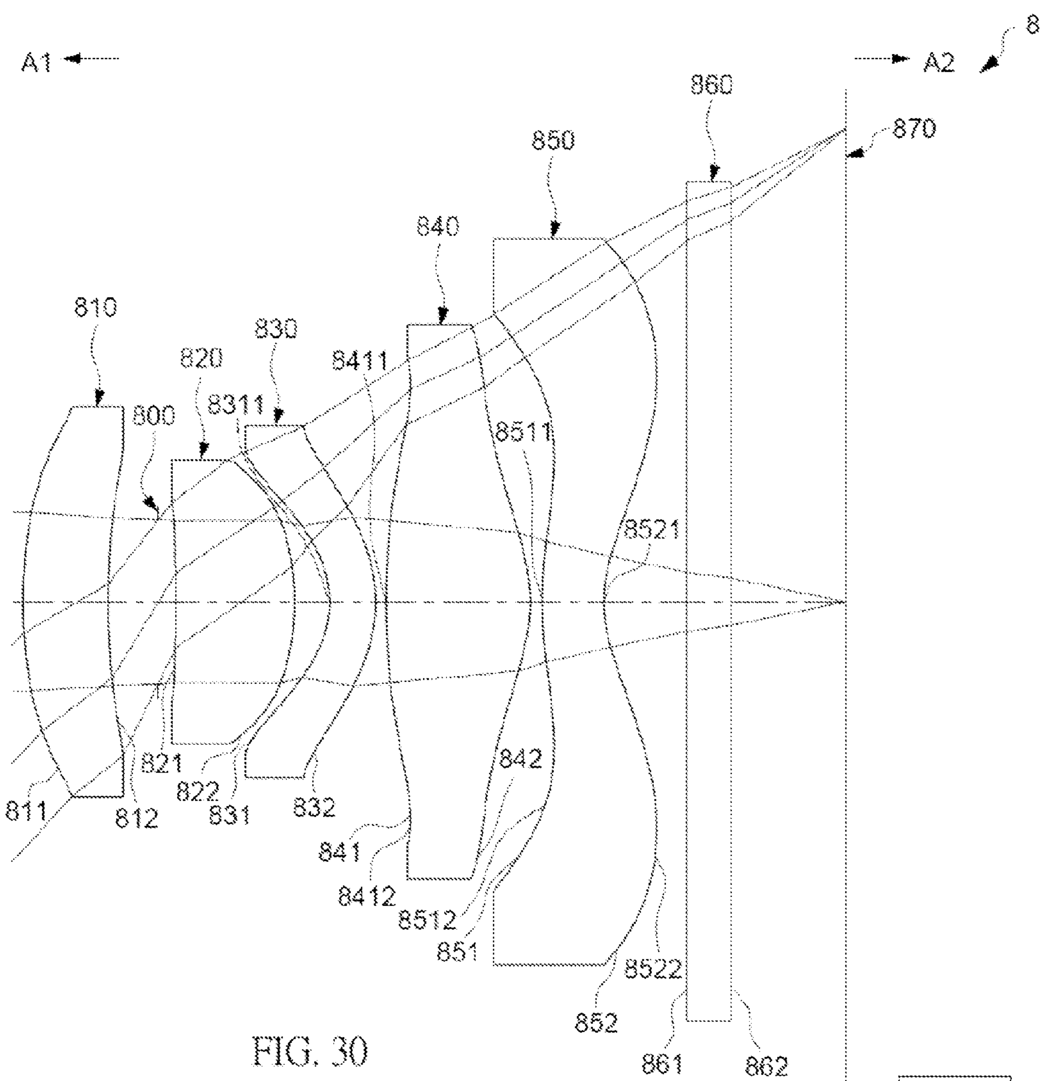
FIG. 30 is a cross-sectional view of an eighth embodiment of an optical imaging lens having five lens elements according to the present disclosures.
Figure 31:
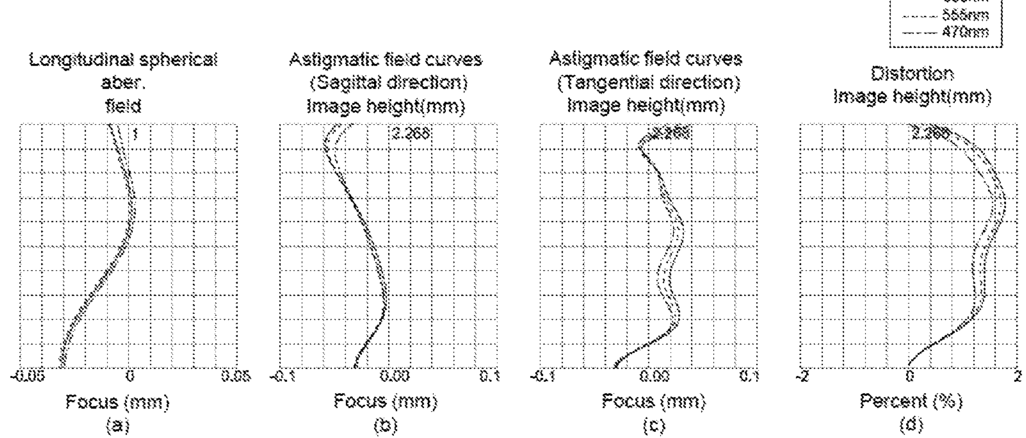
FIG. 31 is a chart of longitudinal spherical aberration and other kinds of optical aberrations of an eighth embodiment of the optical imaging lens according the present disclosures.

Reference is now made to FIGS. 30-33. FIG. 30 illustrates an example cross-sectional view of an optical imaging lens 8 having five lens elements of the optical imaging lens according to an eighth example embodiment. FIG. 31 shows example charts of longitudinal spherical aberration and other kinds of optical aberrations of the optical imaging lens 8 according to the eighth example embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the eighth embodiment is similar to the first embodiment. The optical imaging lens 8, in an order from an object side A1 to an image side A2, comprises an aperture stop 800, first lens element to fifth lens element 810-850. A filtering unit 760 and an image plane 870 of an image sensor are positioned at the image side A2 of the optical imaging lens 8. The arrangement of the convex or concave surface structures, including the object-side surfaces 811, 821, 831, 841, 851 and image-side surfaces 812, 822, 832, 842, 852 are generally same with the optical imaging lens 1. The difference between the optical imaging lens 1 and the optical imaging lens 8 is the radius of curvature, EFL, the values of the central thicknesses of the lens elements 810-850 and the air gaps between the lens elements 810-850 are slight different from the values of the optical imaging lens 1.

Please refer to FIG. 32 for the optical characteristics of each lens elements in the optical imaging lens 8 and thicknesses of the air gaps of the present embodiment, in which the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 are:

BFL/T5=3.958, satisfying Equation (1), and (1');
BFL/AG23=6.827, satisfying Equation (2), and (2');
ALT/T5=7.428, satisfying Equation (3), and (3');
AAG/AG12=1.869, satisfying Equation (4), and (4');
T3/AG23=1.298, satisfying Equation (5), and (5');
BFL/AG12=3.607, satisfying Equation (6), and (6');
T1/T5=1.393, satisfying Equation (7), and (7');
T2/T3=2.569, satisfying Equation (8), and (8');
AG23/AG12=0.528, satisfying Equation (9), and (9');
BFL/AAG=1.930, satisfying Equation (10), and (10');
BFL/T2=2.048, satisfying Equation (11), and (11');
T4/T1=1.688, satisfying Equation (12), and (12');
AAG/T4=0.873, satisfying Equation (13), and (13');
T5/AG23=1.725, satisfying Equation (14), and (14'); and
T1/AG12=1.269, satisfying Equation (15), and (15').

As shown in FIGS. 31(*a*)-31(*d*), the optical imaging lens 8 of the present embodiment shows great characteristics in longitudinal spherical aberration 31(*a*), astigmatism in the sagittal direction 31(*b*), astigmatism in the tangential direction 31(*c*), and distortion aberration 31(*d*). Therefore, according to the above illustration, the optical imaging lens of the present embodiment indeed shows great optical performance and the length of the optical imaging lens 8 is effectively shortened. Accordingly, the system length of the optical imaging lens 8 is shortened to be less than 4.00 mm approximately, and HFOV is reached 44 degrees, which could overcome the chromatic aberration and provide better image quality. Therefore, the present embodiment achieves great optical performance and the length of the optical imaging lens 8 is effectively shortened.

Please refer to FIG. 34 which shows the values of BFL/T5, BFL/AG23, ALT/T5, AAG/AG12, T3/AG23, BFL/AG12, T1/T5, T2/T3, AG23/AG12, BFL/AAG, BFL/T2, T4/T1, AAG/T4, T5/AG23, and T1/AG12 of all eight embodiments, and it is clear that the optical imaging lens of the present invention satisfy the Equations (1) and/or (1'), (2) and/or (2'), (3) and/or (3'), (4) and/or (4'), (5) and/or (5'), (6) and/or (6'), (7) and/or (7'), (8) and/or (8'), (9) and/or (9'), (10) and/or (10'), (11) and/or (11'), (12) and/or (12'), (13) and/or (13'), (14) and/or (14'), or (15) and/or (15').

Figure 35:
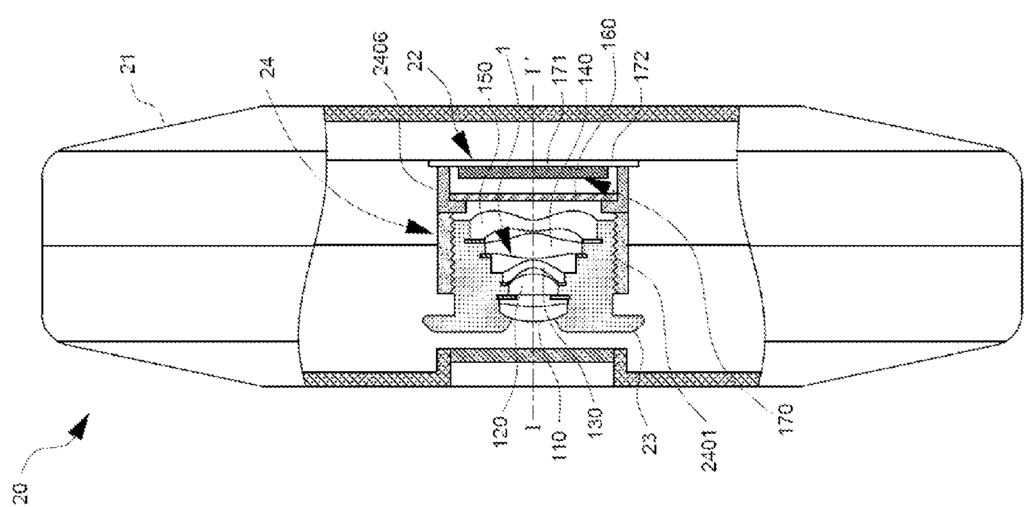
FIG. 35 is a structure of an example embodiment of a mobile device.

Please refer to FIG. 35, which shows an example structural view of a first embodiment of mobile device 20 applying an aforesaid optical imaging lens. The mobile device 20 comprises a housing 21 and a photography module 22 positioned in the housing 21. An example of the mobile device 20 may be, but is not limited to, a mobile phone.

Figure 36:
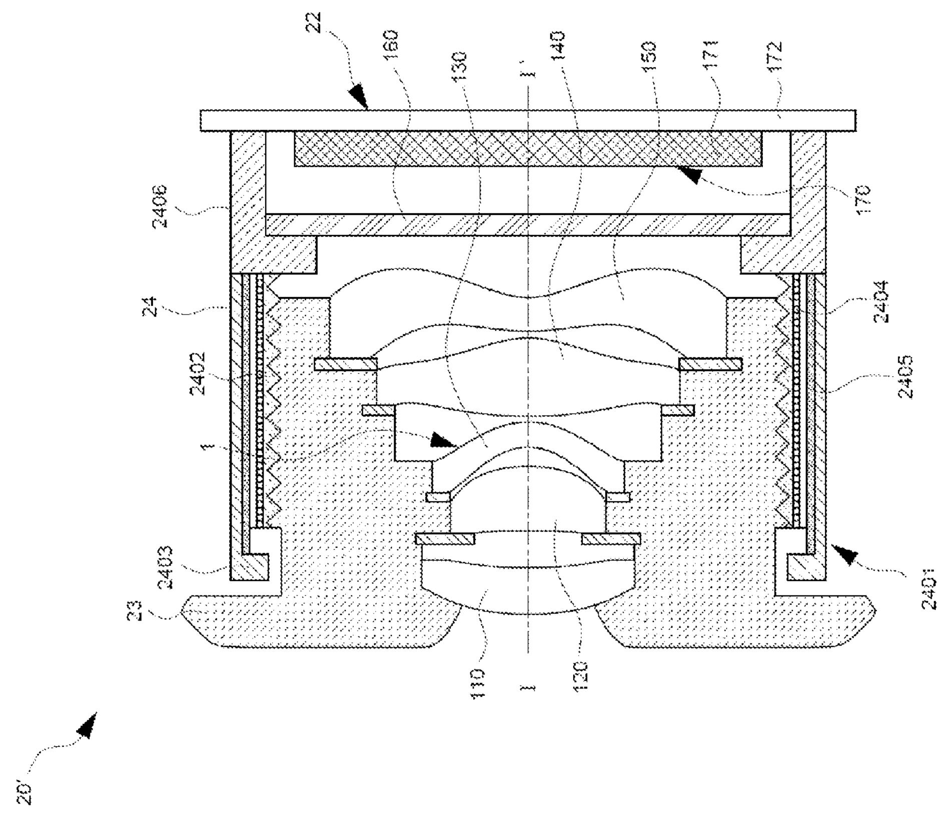
FIG. 36 is a partially enlarged view of the structure of another example embodiment of a mobile device.

As shown in FIG. 36, the photography module 22 may comprise an aforesaid optical imaging lens, for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 are positioned in the lens barrel 23 in the way of separated by an air gap between any two adjacent lens elements.

The module housing unit 24 comprises a seat element 2401 for positioning the lens barrel 23 and an image sensor backseat 2406, in which the image sensor backseat 2406 is not necessary in other embodiment. The lens barrel 23 and the seat element 2401 are positioned along a same axis I-I', and the lens barrel 23 is positioned inside the seat element 2401.

Because the length of the optical imaging lens 1 is merely 3.946 (mm), the size of the mobile device 20 may be quite small. Therefore, the embodiments described herein meet the market demand for smaller sized product designs.

Reference is now made to FIG. 36, which shows another structural view of a second embodiment of mobile device 20' applying the aforesaid optical imaging lens 1. One difference between the mobile device 20' and the mobile device 20 may be the seat element 2401 further comprises a first lens seat 2402, a second lens seat 2403, a coil 2404, and a magnetic unit 2405. The first lens seat 2402, which is close to the outside of the lens barrel 23, and the lens barrel 23 are positioned along an axis II'. The second lens seat 2403 is positioned along the axis II' and around the outside of the first lens seat 2402. The coil 2404 is positioned between the outside of the first lens seat 2402 and the inside of the second lens seat 2403. The magnetic unit 2405 is positioned between the outside of the coil 2404 and the inside of the second lens seat 2403. The end facing to the image side of the image sensor backseat 2406 is close to the second lens seat 2403.

The lens barrel 23 and the optical imaging lens 1 positioned therein are driven by the first lens seat 2402 to move along the axis II'. The rest structure of the mobile device 20' is similar to the mobile device 20.

Similarly, because the length of the optical imaging lens 3.946 mm, is shortened, the mobile device 20' may be designed with a smaller size and meanwhile good optical performance is still provided. Therefore, the present embodiment meets the market demand for smaller sized product designs, and maintains good optical characteristics and image quality. Accordingly, the present embodiment not only reduces raw material amount of housing for economic benefits, but also meets smaller sized product design trend and consumer demand.

According to above illustration, it is clear that the mobile device and the optical imaging lens thereof in example embodiments, through controlling ratio of at least one central thickness of lens element to a sum of all air gaps along the optical axis between five lens elements in a predetermined range, and incorporated with detail structure and/or reflection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as a admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth and fifth lens elements, each of said lens elements having an object-side surface facing toward the object side and an image-side surface facing toward the image side, wherein:

said first lens element has a positive refractive power, and said object-side surface thereof is a convex surface;

said second lens element has a refractive power;

said object-side surface of said third lens element comprises a concave portion in a vicinity of the optical axis;

said fourth lens element has a positive refractive power, and said object-side surface thereof comprises a convex portion in a vicinity of the optical axis and a concave portion in a vicinity of periphery of the fourth lens element;

said fifth lens element has a refractive power, and said image-side surface thereof comprises a concave portion in a vicinity of the optical axis and a convex portion in a vicinity of a periphery of the fifth lens element; and said optical imaging lens as a whole has only the five lens elements having refractive power.

2. The optical imaging lens according to claim 1, wherein a distance from the image-side surface of the fifth lens element to an image plane along the optical axis is defined as a back focal length of the optical imaging lens (BFL), a central thickness of the fifth lens element along the optical axis is T5, and BFL and T5 satisfy the equation:

$$2.0 \leq BFL/T5.$$

3. The optical imaging lens according to claim 2, wherein an air gap between the second lens element and the third lens element along the optical axis is AG23, and BFL and AG23 satisfy the equation:

$$3.5 \leq BFL/AG23.$$

4. The optical imaging lens according to claim 1, wherein the sum of the thickness of all five lens elements along the optical axis is ALT, a central thickness of the fifth lens element along the optical axis is T5, and ALT and T5 satisfy the equation:

$$ALT/T5 \leq 10.0.$$

5. The optical imaging lens according to claim 4, wherein the sum of all four air gaps from the first lens element to the fifth lens element along the optical axis is AAG, an air gap between the first lens element and the second lens element along the optical axis is AG12, and AAG and AG12 satisfy the equation:

$$AAG/AG12 \leq 8.0.$$

6. The optical imaging lens according to claim 1, wherein a central thickness of the third lens element along the optical axis is T3, an air gap between the second lens element and the third lens element along the optical axis is AG23, and T3 and AG23 satisfy the equation:

$$0.7 \leq T3/AG23.$$

7. The optical imaging lens according to claim 6, wherein a distance from the image-side surface of the fifth lens element to an image plane along the optical axis is defined as a back focal length of the optical imaging lens (BFL), an air gap between the first lens element and the second lens element along the optical axis is AG12, and BFL and AG12 satisfy the equation:

$$BFL/AG12 \leq 5.0.$$

8. The optical imaging lens according to claim 1, wherein a central thickness of the first lens element along the optical axis is T1, a central thickness of the fifth lens element along the optical axis is T5, and T1 and T5 satisfy the equation:

$$T1/T5 \leq 2.0.$$

9. The optical imaging lens according to claim 8, wherein a central thickness of the second lens element along the optical axis is T2, a central thickness of the third lens element along the optical axis is T3, and T2 and T3 satisfy the equation:

$$1.2 \leq T2/T3.$$

10. The optical imaging lens according to claim 1, wherein an air gap between the second lens element and the third lens element along the optical axis is AG23, an air gap between the first lens element and the second lens element along the optical axis is AG12, and AG23 and AG12 satisfy the equation:

$$AG23/AG12 \leq 5.0.$$

11. The optical imaging lens according to claim 10, wherein a distance from the image-side surface of the fifth lens element to an image plane along the optical axis is defined as a back focal length of the optical imaging lens (BFL), the sum of all four air gaps from the first lens element to the fifth lens element along the optical axis is AAG, and BFL and AAG satisfy the equation:

$$1.4 \leq BFL/AAG.$$

12. The optical imaging lens according to claim 1, wherein a distance from the image-side surface of the fifth lens element to an image plane along the optical axis is defined as a back focal length of the optical imaging lens (BFL), a central thickness of the second lens element along the optical axis is T2, and BFL and T2 satisfy the equation:

$$BFL/T2 \leq 3.0.$$

13. The optical imaging lens according to claim 12, wherein a central thickness of the first lens element along the optical axis is T1, a central thickness of the fourth lens element along the optical axis is T4, and T1 and T4 satisfy the equation:

$$1.0 \leq T4/T1.$$

14. The optical imaging lens according to claim 1, wherein the sum of all four air gaps from the first lens element to the fifth lens element along the optical axis is AAG, a central thickness of the fourth lens element along the optical axis is T4, and AAG and T4 satisfy the equation:

$$AAG/T4 \leq 2.0.$$

15. The optical imaging lens according to claim 14, wherein a central thickness of the fifth lens element along the optical axis is T5, an air gap between the second lens element and the third lens element along the optical axis is AG23, and T5 and AG23 satisfy the equation:

$$1.0 \leq T5/AG23.$$

16. The optical imaging lens according to claim 1, wherein a central thickness of the first lens element along the optical axis is T1, an air gap between the first lens element and the second lens element along the optical axis is AG12, and T1 and AG12 satisfy the equation:

$$T1/AG12 \leq 2.5.$$

17. The optical imaging lens according to claim 1, wherein a half field of view of the optical imaging lens is HFOV, and HFOV satisfies the equation:

$$38° \leq HFOV \leq 48°.$$

18. A mobile device, comprising:

a housing; and a photography module positioned in the housing and comprising:

- a lens barrel;
- an optical imaging lens, sequentially from an object side to an image side along an optical axis, comprising first, second, third, fourth and fifth lens elements, each of said lens elements having an object-side surface facing toward the object side and an image-side surface facing toward the image side, wherein:
  - said first lens element has a refractive power, and said object-side surface thereof is a convex surface;
  - said second lens element has a refractive power;
  - said object-side surface of said third lens element comprises a concave portion in a vicinity of the optical axis;
  - said fourth lens element has a positive refractive power, and said object-side surface thereof comprises a convex portion in a vicinity of the optical axis and a concave portion in a vicinity of periphery of the fourth lens element;
  - said fifth lens element has a refractive power, and said image-side surface thereof comprises a concave portion in a vicinity of the optical axis and a convex portion in a vicinity of a periphery of the fifth lens element;

said optical imaging lens as a whole has only the five lens elements having refractive power; and the optical imaging lens is positioned in the lens barrel;

a module housing unit for positioning the lens barrel; and an image sensor positioned at the image side of the optical imaging lens.

* * * * *